United States Patent
Walkin et al.

(10) Patent No.: US 9,967,203 B2
(45) Date of Patent: *May 8, 2018

(54) ACCESS CONTROL FOR MESSAGE CHANNELS IN A MESSAGING SYSTEM

(71) Applicant: Machine Zone, Inc., Palo Alto, CA (US)

(72) Inventors: Lev Walkin, Santa Clara, CA (US); Igor Milyakov, Sunnyvale, CA (US); Oleg Khabinov, Sunnyvale, CA (US); Dmitry Demeschchuk, Oakland, CA (US)

(73) Assignee: SATORI WORLDWIDE, LLC, Palo Alto, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/231,044

(22) Filed: Aug. 8, 2016

(65) Prior Publication Data
US 2018/0041444 A1 Feb. 8, 2018

(51) Int. Cl.
| | |
|---|---|
| G06F 15/16 | (2006.01) |
| H04L 12/925 | (2013.01) |
| H04L 29/06 | (2006.01) |
| H04L 12/58 | (2006.01) |
| H04W 12/08 | (2009.01) |

(52) U.S. Cl.
CPC ............ *H04L 47/722* (2013.01); *H04L 51/06* (2013.01); *H04L 67/42* (2013.01); *H04W 12/08* (2013.01)

(58) Field of Classification Search
CPC ....... H04L 67/325; H04L 63/10; H04L 63/08; H04L 47/722; H04L 51/06; H04L 67/42

USPC .......................................................... 709/206
See application file for complete search history.

(56) References Cited

U.S. PATENT DOCUMENTS

| | | |
|---|---|---|
| 4,264,924 A | 4/1981 | Freeman |
| 5,706,331 A | 1/1998 | Wang et al. |
| 5,878,228 A | 3/1999 | Miller et al. |
| (Continued) | | |

OTHER PUBLICATIONS

Bustamante, F., "The Active Streams Approach to Adaptive Distributed Applications and Services," Thesis, Georgia Institute of Technology; 112pgs.; Nov. 2001.
(Continued)

*Primary Examiner* — Kristie Shingles
(74) *Attorney, Agent, or Firm* — Womble Bond Dickinson (US) LLP; Daniel Ovanezian

(57) ABSTRACT

Methods, systems, and apparatus, including computer programs encoded on a computer storage medium, for receiving one or more subscription requests, wherein each subscription request is received from a respective subscriber client and is for a respective channel, authorizing one or more of the subscription requests, wherein each authorized subscription request permits the subscriber client of the request to receive messages published to the channel of the request, receiving one or more messages for publication, wherein each message is received from a respective publisher client and is for publication on a respective channel, for each of the messages, placing the message in a respective buffer for the channel of the message, wherein the messages are present in the buffer during a finite time-to-live period for the buffer, and for one or more of the buffers, sending any messages in the buffer to subscriber clients that are authorized.

20 Claims, 11 Drawing Sheets

(56) References Cited

U.S. PATENT DOCUMENTS

| | | | |
|---|---|---|---|
| 6,208,691 B1 | 3/2001 | Balakrishnan et al. | |
| 6,549,959 B1 | 4/2003 | Yates et al. | |
| 7,047,394 B1 | 5/2006 | Van Dyke et al. | |
| 7,065,633 B1 | 6/2006 | Yates, Jr. et al. | |
| 7,376,092 B2 | 5/2008 | Yajnik et al. | |
| 7,613,813 B2 | 11/2009 | Hussain et al. | |
| 7,668,908 B2 | 2/2010 | Kakivaya et al. | |
| 7,676,580 B2 | 3/2010 | Hill et al. | |
| 7,774,720 B1 | 8/2010 | Demetriades et al. | |
| 7,917,124 B2 * | 3/2011 | D'Angelo | H04L 67/02 370/356 |
| 7,929,562 B2 | 4/2011 | Petrovykh | |
| 7,934,070 B2 * | 4/2011 | Brittain | A61C 17/349 711/167 |
| 7,941,448 B2 | 5/2011 | Eslambolchi et al. | |
| 7,970,828 B2 | 6/2011 | Carmeli et al. | |
| 7,970,918 B2 | 6/2011 | Thompson et al. | |
| 8,042,140 B2 * | 10/2011 | Thomas | G06F 3/1415 725/94 |
| 8,051,140 B2 * | 11/2011 | Lum | G06F 21/41 709/217 |
| 8,065,384 B2 * | 11/2011 | Plewnia | G06F 21/41 709/217 |
| 8,065,504 B2 | 11/2011 | Yates, Jr. et al. | |
| 8,068,901 B2 * | 11/2011 | Ghanem | A61B 5/0456 600/509 |
| 8,074,055 B1 | 12/2011 | Yates, Jr. et al. | |
| 8,086,672 B2 | 12/2011 | Horvitz | |
| 8,121,828 B2 | 2/2012 | Yates, Jr. et al. | |
| 8,375,095 B2 | 2/2013 | Yurkovich et al. | |
| 8,392,555 B2 | 3/2013 | Gale et al. | |
| 8,429,702 B2 | 4/2013 | Yasrebi et al. | |
| 8,441,965 B2 | 5/2013 | Jazra | |
| 8,489,674 B2 | 7/2013 | Srivastava et al. | |
| 8,539,359 B2 | 9/2013 | Rapaport et al. | |
| 8,572,296 B2 * | 10/2013 | Shasha | G06F 13/30 710/22 |
| 8,605,781 B2 | 12/2013 | Rabenold et al. | |
| 8,774,203 B2 * | 7/2014 | Scott | H04L 1/0079 370/230 |
| 8,799,213 B2 | 8/2014 | Wong et al. | |
| 8,850,015 B2 | 9/2014 | Finn | |
| 8,850,490 B1 * | 9/2014 | Thomas | H04N 21/47211 725/109 |
| 8,856,202 B2 | 10/2014 | McCabe et al. | |
| 8,886,731 B2 | 11/2014 | Gunawardena et al. | |
| 8,898,293 B2 | 11/2014 | Raleigh et al. | |
| 8,908,814 B2 * | 12/2014 | Kumar | H03M 13/2957 375/340 |
| 8,937,962 B2 | 1/2015 | Tomonaga et al. | |
| 8,965,409 B2 | 2/2015 | Abhyanker | |
| 9,043,822 B1 | 5/2015 | Calzone et al. | |
| 9,215,261 B2 | 12/2015 | Marcus | |
| 9,270,944 B2 | 2/2016 | Brooks et al. | |
| 9,319,363 B1 | 4/2016 | Walkin et al. | |
| 9,319,365 B1 | 4/2016 | Milyakov | |
| 9,385,976 B1 | 7/2016 | Hafri | |
| 9,388,976 B2 * | 7/2016 | Tilmont | E21B 36/02 |
| 9,407,585 B1 * | 8/2016 | Walkin | H04L 51/04 |
| 9,407,593 B1 | 8/2016 | Milyakov | |
| 9,577,911 B1 | 2/2017 | Castleman | |
| 9,602,450 B1 | 3/2017 | Kushnir et al. | |
| 9,602,455 B2 | 3/2017 | Walkin et al. | |
| 9,608,928 B1 | 3/2017 | Walkin | |
| 9,608,953 B1 | 3/2017 | Kushnir et al. | |
| 9,699,260 B2 * | 7/2017 | Walkin | H04L 67/26 |
| 2002/0016851 A1 | 2/2002 | Border | |
| 2004/0073641 A1 | 4/2004 | Minhazuddin et al. | |
| 2004/0083264 A1 | 4/2004 | Veselov | |
| 2004/0139166 A1 | 7/2004 | Collison | |
| 2004/0139309 A1 | 7/2004 | Gentil et al. | |
| 2004/0167932 A1 | 8/2004 | Edmonds | |
| 2005/0021622 A1 | 1/2005 | Cullen | |
| 2005/0047396 A1 | 3/2005 | Helm et al. | |
| 2005/0171799 A1 | 8/2005 | Hull et al. | |
| 2005/0262205 A1 | 11/2005 | Nikolov et al. | |
| 2005/0262215 A1 | 11/2005 | Kirov et al. | |
| 2006/0036679 A1 | 2/2006 | Goodman et al. | |
| 2006/0106840 A1 | 5/2006 | Rooney | |
| 2006/0149787 A1 | 7/2006 | Surlaker et al. | |
| 2007/0013948 A1 | 1/2007 | Bevan | |
| 2007/0028173 A1 | 2/2007 | Lauder | |
| 2008/0016198 A1 | 1/2008 | Johnston-Watt et al. | |
| 2008/0186973 A1 | 8/2008 | Shihara et al. | |
| 2008/0235366 A1 | 9/2008 | Telfer | |
| 2009/0037514 A1 | 2/2009 | Lankford et al. | |
| 2009/0157795 A1 | 6/2009 | Black | |
| 2009/0222348 A1 | 9/2009 | Ransom et al. | |
| 2009/0259756 A1 * | 10/2009 | Karlsson | H04L 47/10 709/228 |
| 2009/0287761 A1 | 11/2009 | Hawkins et al. | |
| 2010/0251262 A1 | 9/2010 | Rokicki et al. | |
| 2011/0060812 A1 | 3/2011 | Middleton | |
| 2011/0176554 A1 | 7/2011 | Yamada et al. | |
| 2011/0179162 A1 | 7/2011 | Mayo | |
| 2011/0231523 A1 | 9/2011 | Haugland et al. | |
| 2012/0023116 A1 | 1/2012 | Wilkes et al. | |
| 2012/0150960 A1 | 6/2012 | Nalawade | |
| 2012/0197990 A1 | 8/2012 | Li et al. | |
| 2012/0278728 A1 | 11/2012 | Malin et al. | |
| 2012/0284756 A1 | 11/2012 | Kotecha et al. | |
| 2013/0031162 A1 | 1/2013 | Willis et al. | |
| 2013/0066967 A1 | 3/2013 | Alexander | |
| 2013/0067114 A1 | 3/2013 | Hjelm et al. | |
| 2013/0081060 A1 | 3/2013 | Otenko | |
| 2013/0132553 A1 | 5/2013 | Stratton et al. | |
| 2013/0159472 A1 | 6/2013 | Newton et al. | |
| 2013/0212491 A1 | 8/2013 | Yerli | |
| 2013/0254314 A1 | 9/2013 | Chow | |
| 2013/0290449 A1 | 10/2013 | Norby et al. | |
| 2013/0340097 A1 | 12/2013 | Gowel | |
| 2014/0082085 A1 | 3/2014 | Krishnaprasad et al. | |
| 2014/0114738 A1 | 4/2014 | Tseng et al. | |
| 2014/0189772 A1 | 7/2014 | Yamagishi et al. | |
| 2014/0226713 A1 | 8/2014 | Perlman et al. | |
| 2014/0237057 A1 | 8/2014 | Khodorenko | |
| 2014/0286354 A1 | 9/2014 | Van De Poel et al. | |
| 2014/0310369 A1 | 10/2014 | Makhervaks et al. | |
| 2014/0372489 A1 | 12/2014 | Jaiswal et al. | |
| 2014/0372755 A1 | 12/2014 | Ristock et al. | |
| 2015/0012598 A1 | 1/2015 | Klimt | |
| 2015/0100664 A1 | 4/2015 | Flack et al. | |
| 2015/0207851 A1 | 7/2015 | Nampally | |
| 2015/0262151 A1 | 9/2015 | Enzminger et al. | |
| 2015/0317676 A1 | 11/2015 | Reid et al. | |
| 2015/0365358 A1 | 12/2015 | Strassner | |
| 2015/0379160 A1 | 12/2015 | Avraham et al. | |
| 2016/0072865 A1 | 3/2016 | Kaplinger et al. | |
| 2016/0080334 A1 | 3/2016 | Hamilton | |
| 2016/0219089 A1 * | 7/2016 | Murthy | H04L 65/4076 |
| 2016/0261480 A1 | 9/2016 | Agarwal et al. | |
| 2016/0285986 A1 | 9/2016 | Mokhtari et al. | |

OTHER PUBLICATIONS

Cagle, K., "Convert a Text File to XML," accessed on the internet at http://www.devx.com/getHelpOn/10MinuteSolution/20356; downloaded Sep. 22, 2016; 8pgs.

Cilia, M., et al., "Looking into the Past: Enhancing Mobile Publish/Subscribe Middleware," Proceedings of the 2nd Int'l Workshop on Distributed Event-based Systems (DEBS '03); pp. 1-8; Jun. 2003.

Int'l Search Report and Written Opinion of the ISA/EP in PCT/US2016/039958; dated Oct. 4, 2016; 11 pgs.

King, A., et al., "Load Balancing Content-Based Publish/Subscribe Systems," ACM Transactions on Computer Systems; 28(4):9:1-9:55; Dec. 2010.

Phanishayee, A., "Chaining for Flexible and High-Performance Key-Value Systems," Doctoral Dissertation, Carnegie Mellon University, School of Computer Science; 148pgs.; Sep. 2012.

Chakravarthy, S. and Vontella, N., "A Publish / Subscribe Based Architecture of an Alert Server to Support Prioritized and Persistent

(56) References Cited

OTHER PUBLICATIONS

Alerts," Lecture Notes in Computer Science; 3347:1-6-116; Jan. 2004.
Corsaro, A., et al., "Quality of Service in Publish/Subscribe Middleware," IOS Press; pp. 1-19; 2003.
Int'l Search Report and Written Opinion of the ISA/EP in PCT/US2016/022316; dated Jun. 1, 2016; 11 pgs.
Int'l Search Report and Written Opinion of the ISA/EP in PCT/US2016/023164; dated Jul. 11, 2016; 15pgs.
Vahdat, A. and Becker, D., "Epidemic Routing for Partially-Connected Ad Hoc Networks," Duke University; 14pgs.; Jul. 2000.
Zeidler, et al., "Mobility Support with REBECA," Proc. 23rd Int'l Conference on Distributed Computing Systems Workshops; May 19-22, 2003; 7pgs.
"Cloud Pub/Sub," accessed on the internet at: https://cloud.google.com/pubsub/overview; downloaded Aug. 7, 2015; 5pgs.
"Publish—subscribe pattern"; accessed on the internet at: https://en.wikipedia.org/wiki/Publish%E2%80%93subscribe_pattern; downloaded Aug. 7, 2015; 4pgs.
"Welcome to PyPubSub's Home page!," accessed on the internet at: http://pubsub.sourceforge.net/; downloaded Aug. 7, 2015; 2pgs.
U.S. Appl. No. 14/821,416, filed Aug. 7, 2015, Scalable, Real-Time Messaging System, Walkin, et al.
U.S. Appl. No. 15/223,392, filed Jul. 29, 2016, Scalable, Real-Time Messaging System, Walkin, et al.
U.S. Appl. No. 14/821,421, filed Aug. 7, 2015, Scalable, Real-Time Messaging System, Walkin, et al.
U.S. Appl. No. 15/067,476, filed Mar. 11, 2016, Scalable, Real-Time Messaging System, Walkin, et al.
U.S. Appl. No. 15/175,588, filed Jun. 7, 2016, Message Compression in Scalable Messaging System, Walkin.
U.S. Appl. No. 15/202,908, filed Jul. 6, 2016, Multiple-Speed Message Channel of Messaging System, Walkin.
U.S. Appl. No. 15/063,390, filed Mar. 7, 2016, Systems and Methods for Storing and Transferring Message Data, Milyakov.
U.S. Appl. No. 14/879,661, filed Oct. 9, 2015, Systems and Methods for Storing Message Data, Hafri.
U.S. Appl. No. 14/885,034, filed Oct. 16, 2015, Systems and Methods for Transferring Message Data, Kushnir, et al.
U.S. Appl. No. 15/196,597, filed Jun. 29, 2016, Systems and Methods for Transferring Message Data, Kushnir, et al.
U.S. Appl. No. 15/155,384, filed May 16, 2016, Maintaining Persistence of a Messaging System, Kushnir, et al.
Int'l Search Report and Written Opinion of the ISA/EP in PCT/041531; dated Oct. 6, 2016; 12 pgs.
Int'l Search Report and Written Opinion of the ISA/EP in PCT/US2016/037358; dated Oct. 10, 2016; 13pgs.
Int'l Search Report and Written Opinion of the ISA/EP in PCT/US2016/041530; dated Oct. 6, 2016; 12pgs.
Jafarpour et al., "Dynamic Load Balancing for Cluster-based Publish/Subscribe System," IEEE 2009; http://ieeexplore.ieee.org/document/5230660/.
Preshing, "Atomic vs. Non-Atomic Operations," accessed on the internet at http://preshing.com/20130618/atomic-vs-non-atomic-operations; downloaded Sep. 20, 2016; 10pgs.
Int'l Search Report and Written Opinion of the ISA/EP in PCT/US2017/045461 dated Nov. 2, 2017; 13 pgs.
U.S. Appl. No. 15/442,286, filed Feb. 24, 2017, Data Storage Systems and Methods Using a Real-Time Messaging System.
U.S. Appl. No. 15/442,061, filed Feb. 24, 2017, Channel Management in Scalable Messaging System.
U.S. Appl. No. 15/442,036, filed Feb. 24, 2017, Selective Distribution of Messages in a Scalable, Real-Time Messaging System.
U.S. Appl. No. 15/436,217, filed Feb. 17, 2017, Scalable, Real-Time Messaging System.
U.S. Appl. No. 15/435,915, filed Feb. 17, 2017, Systems and Methods for Transferring Message Data.
U.S. Appl. No. 15/433,550, filed Feb. 15, 2017, Maintaining Persistence of a Messaging System.
U.S. Appl. No. 15/433,525, filed Feb. 15, 2017, Multiple-Speed Message Channel of Messaging System.

\* cited by examiner

ACCESS CONTROL FOR MESSAGE CHANNELS IN A MESSAGING SYSTEM

BACKGROUND

This specification relates to a data communication system and, in particular, a system that implements access control for messaging channels.

The publish—subscribe pattern (or "PubSub") is a data communication messaging arrangement implemented by software systems where so-called publishers publish messages to topics and so-called subscribers receive the messages pertaining to particular topics to which they are subscribed. There can be one or more publishers per topic and publishers generally have no knowledge of what subscribers, if any, will receive the published messages. Some PubSub systems do not cache messages or have small caches meaning that subscribers may not receive messages that were published before the time of subscription to a particular topic. PubSub systems can be susceptible to performance instability during surges of message publications or as the number of subscribers to a particular topic increases.

SUMMARY

In general, one aspect of the subject matter described in this specification can be embodied in methods that include the actions of receiving one or more subscription requests, wherein each subscription request is received from a respective client and is for a respective channel, authorizing one or more of the subscription requests wherein each authorized subscription request permits the subscriber client of the request to receive messages published to the channel of the request, receiving one or more messages for publication, wherein each message is received from a respective publisher client and is for publication on a respective channel, for each of the messages, placing the message in a respective buffer for the channel of the message wherein the messages are present in the buffer during a finite time-to-live period for the buffer, and for one or more of the buffers, sending any messages in the buffer to subscriber clients that are authorized to subscribe to the channel. Other embodiments of this aspect include corresponding systems, apparatus, and computer programs.

These and other aspects can optionally include one or more of the following features. Authorizing a particular subscription request can comprise determining that the channel of a particular subscription request matches a pattern, and authorizing the subscriber client of the particular subscription request based on a permission corresponding to the pattern. The aspect can further comprise receiving one or more publication requests, wherein each publication request is received from the respective publisher client and is for a respective channel, and authorizing one or more of the publication requests wherein each authorized publication request permits the respective publisher client to publish one or more messages to the channel of the request. Placing the message in a respective buffer for the channel of the message can comprise determining that the publisher client from which a particular message was received is authorized to publish messages to the channel of the particular message. Authorizing one or more of the publication requests can comprise determining that the channel of a particular publication request matches a pattern, and authorizing the publisher client of the particular publication request based on a permission corresponding to the pattern. Placing the message in a respective buffer for the channel of the message can comprise deleting any messages in the buffer upon expiration of a time-to-live for the buffer. The aspect can further comprise receiving one or more authentication requests through respective connections, wherein each authentication request is received from a respective client and comprises one or more credentials of the respective client, and for each authentication request: publishing, to a first channel, a first message requesting to authenticate the respective client and comprising the credentials, and retrieving, from the first channel, a published second message, wherein the second message comprises an authentication confirmation provided in response to the first message and, based thereon, authenticating the respective client. The aspect can further comprise storing, in information associated with the respective connection, an indication of the authentication confirmation. The aspect can further comprise determining that the respective connection has ceased to exist and, based thereon, removing the information. The first channel can be not accessible to the respective clients. Determining that the channel of the particular subscription request matches a pattern can comprise determining that one or more name spaces of the channel matches the pattern.

Particular embodiments of the subject matter described in this specification can be implemented to realize one or more of the following advantages. A messaging system provides multiple channels for data communication between publishers and subscribers. Each channel of the messaging system comprises an ordered sequence of messages (a channel stream). The messages are stored in multiple buffers residing on respective queue nodes. Each buffer has a respective time-to-live, e.g., a limited and often short lifetime. A subscriber or publisher can send the messaging system a request for access to a channel in the messaging system. The messaging system can grant (authorize) or deny permission for access by determining whether the channel in the request matches, for example, a pattern in permission rules. A customer of the messaging system can create and moderate customer channels in the messaging system. Instead of authorizing a request from a user (a subscriber or publisher) for accessing a customer channel by itself, the messaging system publishes the request to a specific channel. The customer can subscribe to the specific channel, retrieve the request published to the specific channel, determine whether the user is authorized to access the customer channel, and publish a response (e.g., positive or negative) to the specific channel. The messaging system can retrieve the response from the specific channel, and allow or deny the user access to the customer channel based on the retrieved response. Since the request and corresponding response are stored in the specific channel's channel stream, they are not lost in case of interrupts such as re-start or time-out on the customer or user side.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1A:
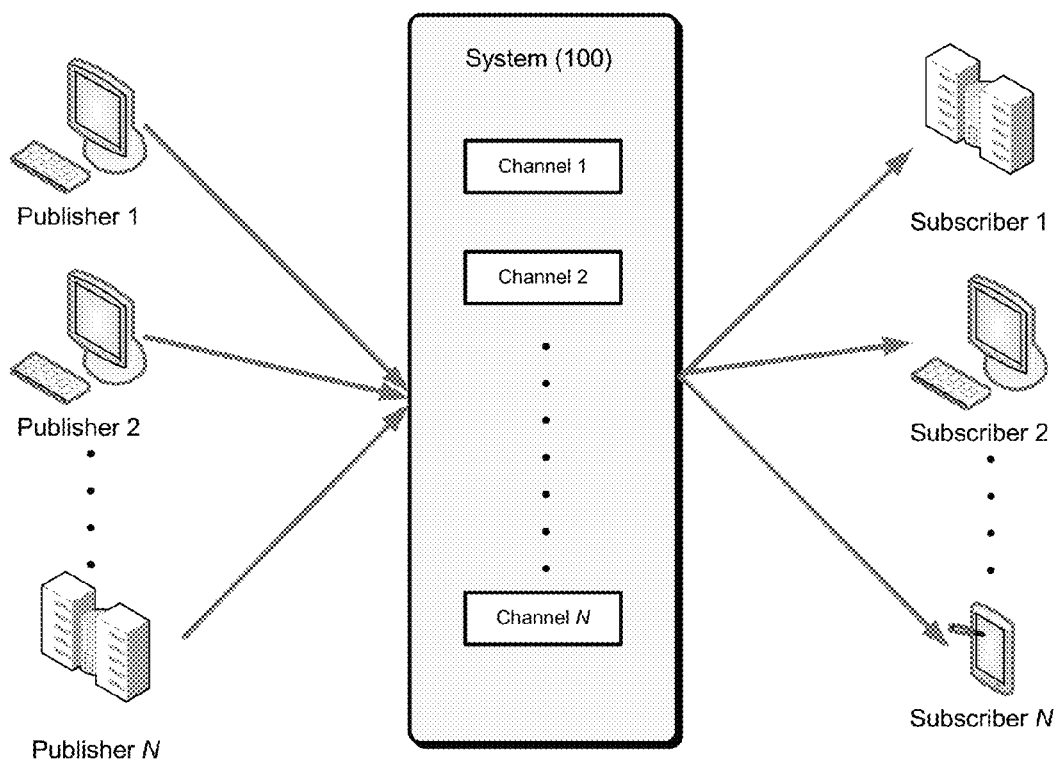
FIG. 1A illustrates an example system that supports the Pub Sub communication pattern.

FIG. 1A illustrates an example system 100 that supports the Pub Sub communication pattern. Publisher clients (e.g., Publisher 1) can publish messages to named channels (e.g., "Channel 1") by way of the system 100. A message can comprise any type of information including one or more of the following: text, image content, sound content, multimedia content, video content, binary data, and so on. Other types of message data are possible. Subscriber clients (e.g., Subscriber 2) can subscribe to a named channel using the system 100 and start receiving messages which occur after the subscription request or from a given position (e.g., a message number or time offset). A client can be both a publisher and a subscriber.

Depending on the configuration, a PubSub system can be categorized as follows:

One to One (1:1). In this configuration there is one publisher and one subscriber per channel. A typical use case is private messaging.

One to Many (1:N). In this configuration there is one publisher and multiple subscribers per channel. Typical use cases are broadcasting messages (e.g., stock prices).

Many to Many (M:N). In this configuration there are many publishers publishing to a single channel. The messages are then delivered to multiple subscribers. Typical use cases are map applications.

There is no separate operation needed to create a named channel. A channel is created implicitly when the channel is subscribed to or when a message is published to the channel. In some implementations, channel names can be qualified by a name space. A name space comprises one or more channel names. Different name spaces can have the same channel names without causing ambiguity. The name space name can be a prefix of a channel name where the name space and channel name are separated by a dot or other suitable separator. In some implementations, name spaces can be used when specifying channel authorization settings. For instance, the messaging system 100 may have app1.foo and app1.system.notifications channels where "app1" is the name of the name space. The system can allow clients to subscribe and publish to the app1.foo channel. However, clients can only subscribe to, but not publish to the app1.system.notifications channel.

Figure 1B:
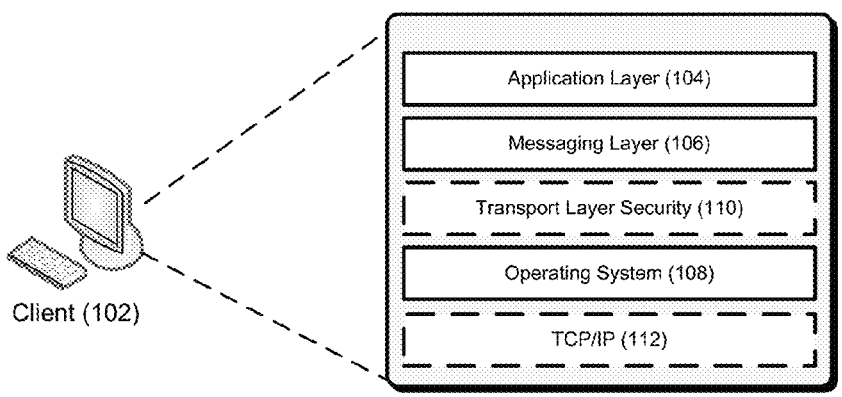
FIG. 1B illustrates functional layers of software on an example client device.

FIG. 1B illustrates functional layers of software on an example client device. A client device (e.g., client 102) is a data processing apparatus such as, for example, a personal computer, a laptop computer, a tablet computer, a smart phone, a smart watch, or a server computer. Other types of client devices are possible. The application layer 104 comprises the end-user application(s) that will integrate with the PubSub system 100. The messaging layer 106 is a programmatic interface for the application layer 104 to utilize services of the system 100 such as channel subscription, message publication, message retrieval, user authentication, and user authorization. In some implementations, the messages passed to and from the messaging layer 106 are encoded as JavaScript Object Notation (JSON) objects. Other message encoding schemes are possible.

The operating system 108 layer comprises the operating system software on the client 102. In various implementations, messages can be sent and received to/from the system 100 using persistent or non-persistent connections. Persistent connections can be created using, for example, network sockets. A transport protocol such as TCP/IP layer 112 implements the Transport Control Protocol/Internet Protocol communication with the system 100 that can be used by the messaging layer 106 to send messages over connections to the system 100. Other communication protocols are possible including, for example, User Datagram Protocol (UDP). In further implementations, an optional Transport Layer Security (TLS) layer 110 can be employed to ensure the confidentiality of the messages.

Figure 2:
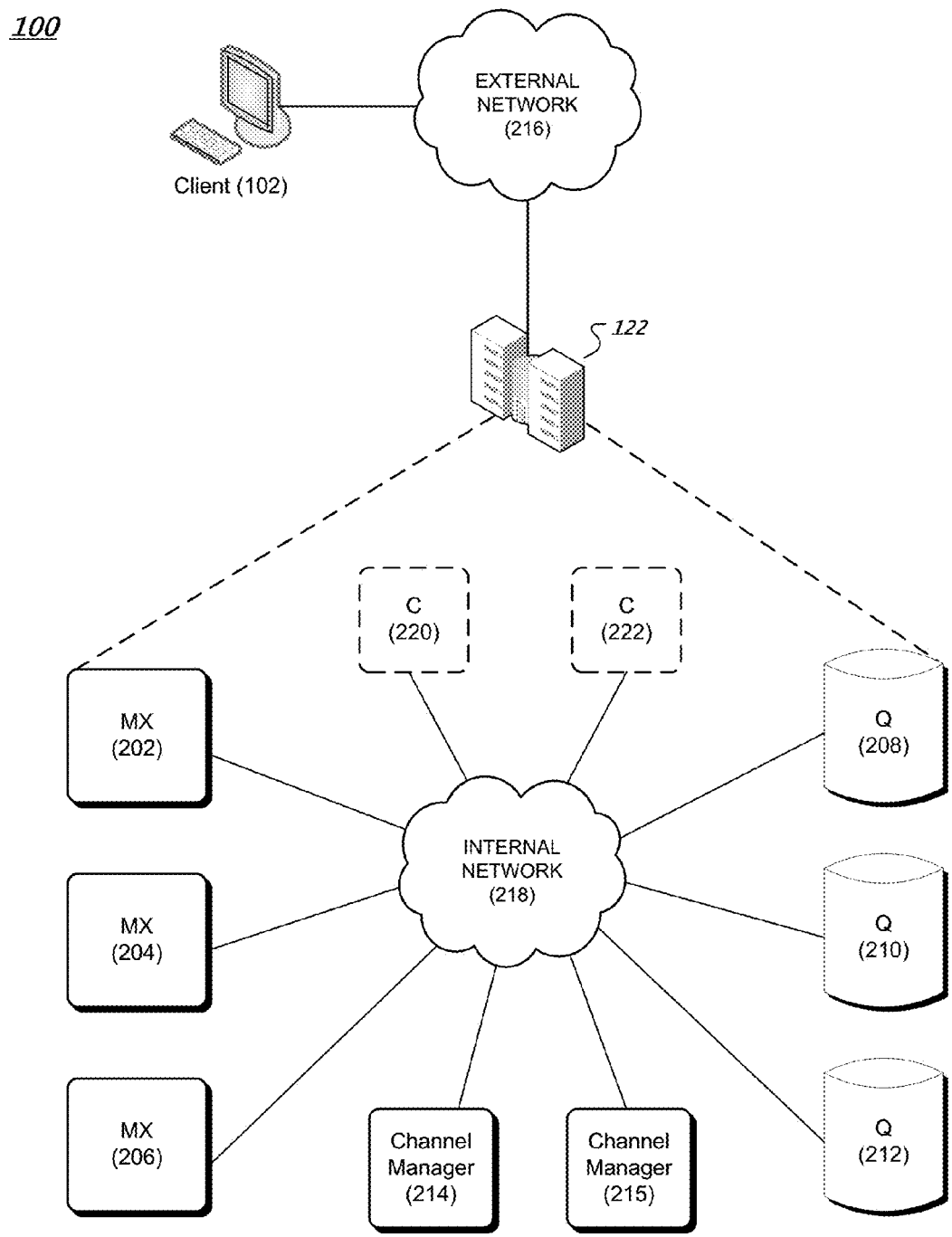
FIG. 2 is a diagram of an example messaging system.

FIG. 2 is a diagram of an example messaging system 100. The system 100 provides functionality for implementing PubSub communication patterns. The system comprises software components and storage that can be deployed at one or more data centers 122 in one or more geographic locations, for example. The system comprises MX nodes (e.g., MX nodes or multiplexer nodes 202, 204 and 206), Q nodes (e.g., Q nodes or queue nodes 208, 210 and 212), one or more channel manager nodes (e.g., channel managers 214, 215), and optionally one or more C nodes (e.g., C nodes or cache nodes 220 and 222). Each node can execute in a virtual machine or on a physical machine (e.g., a data processing apparatus). Each MX node serves as a termination point for one or more publisher and/or subscriber connections through the external network 216. The internal communication among MX nodes, Q nodes, C nodes, and the channel manager, is conducted over an internal network 218, for example. By way of illustration, MX node 204 can be the terminus of a subscriber connection from client 102. Each Q node buffers channel data for consumption by the MX nodes. An ordered sequence of messages published to a channel is a logical channel stream. For example, if three clients publish messages to a given channel, the combined messages published by the clients comprise a channel stream. Messages can be ordered in a channel stream, for example, by time of publication by the client, by time of receipt by an MX node, or by time of receipt by a Q node. Other ways for ordering messages in a channel stream are possible. In the case where more than one message would be assigned to the same position in the order, one of the messages can be chosen (e.g., randomly) to have a later sequence in the order. Each channel manager node is responsible for managing Q node load by splitting channel streams into so-called streamlets. Streamlets are discussed further below. The optional C nodes provide caching and load removal from the Q nodes.

In the example messaging system 100, one or more client devices (publishers and/or subscribers) establish respective persistent connections (e.g., TCP connections) to an MX node (e.g., MX 204). The MX node serves as a termination point for these connections. For instance, external messages (e.g., between respective client devices and the MX node) carried by these connections can be encoded based on an external protocol (e.g., JSON). The MX node terminates the external protocol and translates the external messages to its internal communication, and vice versa. The MX nodes publish and subscribe to streamlets on behalf of clients. In this way, an MX node can multiplex and merge requests of client devices subscribing for or publishing to the same channel, thus representing multiple client devices as one, instead of one by one.

In the example messaging system 100, a Q node (e.g., Q node 208) can store one or more streamlets of one or more channel streams. A streamlet is a data buffer for a portion of a channel stream. A streamlet will close to writing when its storage is full. A streamlet will close to reading and writing and be de-allocated when its time-to-live (TTL) has expired. By way of illustration, a streamlet can have a maximum size of 1 MB and a TTL of three minutes. Different channels can have streamlets limited by different sizes and/or by different TTLs. For instance, streamlets in one channel can exist for up to three minutes, while streamlets in another channel can exist for up to 10 minutes. In various implementations, a streamlet corresponds to a computing process running on a Q node. The computing process can be terminated after the streamlet's TTL has expired, thus freeing up computing resources (for the streamlet) back to the Q node, for example.

When receiving a publish request from a client device, an MX node (e.g., MX 204) makes a request to a channel manager (e.g., channel manager 214) to grant access to a streamlet to write the message being published. Note, however, that if the MX node has already been granted write access to a streamlet for the channel (and the channel has not been closed to writing), the MX node can write the message to that streamlet without having to request a grant to access the streamlet. Once a message is written to a streamlet for a channel, the message can be read by MX nodes and provided to subscribers of that channel.

Similarly, when receiving a channel subscription request from a client device, an MX node makes a request to a channel manager to grant access to a streamlet for the channel from which messages are read. If the MX node has already been granted read access to a streamlet for the channel (and the channel's TTL has not been closed to reading) the MX node can read messages from the streamlet without having to request a grant to access the streamlet. The read messages can then be forwarded to client devices that have subscribed to the channel. In various implementations, messages read from streamlets are cached by MX nodes so that MX nodes can reduce the number of times needed to read from the streamlets.

By way of illustration, an MX node can request a grant from the channel manager that allows the MX node to store a block of data into a streamlet on a particular Q node that stores streamlets of the particular channel. Example streamlet grant request and grant data structures are as follows:

```
StreamletGrantRequest = {
    "channel": string( )
    "mode": "read" | "write"
    "position": 0
}
StreamletGrantResponse = {
    "streamlet-id": "abcdef82734987",
    "limit-size": 2000000, # 2 megabytes max
```

```
    "limit-msgs": 5000, # 5 thousand messages max
    "limit-life": 4000, # the grant is valid for 4 seconds
    "q-node": string( )
    "position": 0
}
```

The StreamletGrantRequest data structure stores the name of the stream channel and a mode indicating whether the MX node intends on reading from or writing to the streamlet. The MX node sends the StreamletGrantRequest to a channel manager node. The channel manager node, in response, sends the MX node a StreamletGrantResponse data structure. The StreamletGrantResponse contains an identifier of the streamlet (streamlet-id), the maximum size of the streamlet (limit-size), the maximum number of messages that the streamlet can store (limit-msgs), the TTL (limit-life), and an identifier of a Q node (q-node) on which the streamlet resides. The StreamletGrantRequest and StreamletGrantResponse can also have a position field that points to a position in a streamlet (or a position in a channel) for reading from the streamlet.

A grant becomes invalid once the streamlet has closed. For example, a streamlet is closed to reading and writing once the streamlet's TTL has expired and a streamlet is closed to writing when the streamlet's storage is full. When a grant becomes invalid, the MX node can request a new grant from the channel manager to read from or write to a streamlet. The new grant will reference a different streamlet and will refer to the same or a different Q node depending on where the new streamlet resides.

Figure 3A:
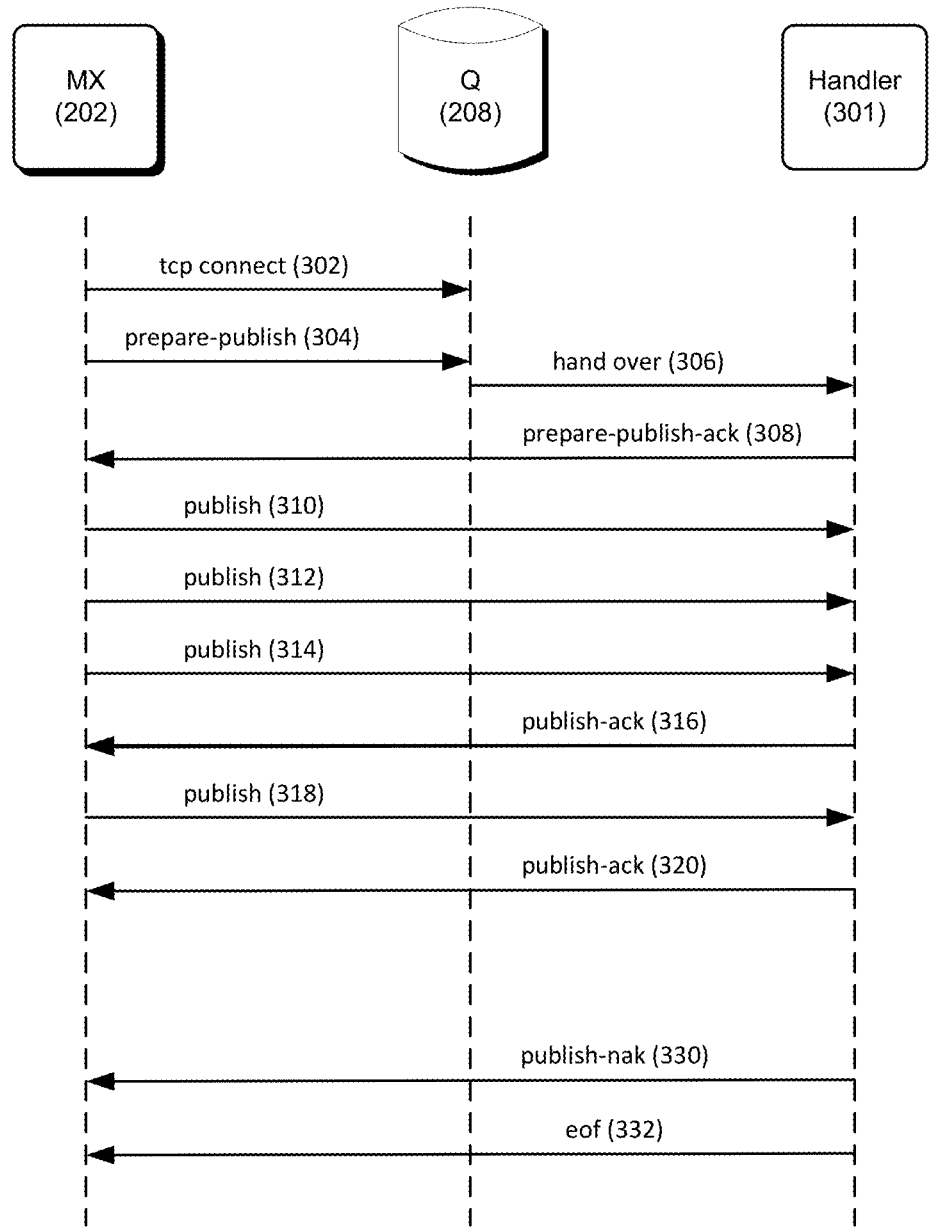
FIG. 3A is a data flow diagram of an example method for writing data to a streamlet.

FIG. 3A is a data flow diagram of an example method for writing data to a streamlet in various embodiments. In FIG. 3A, when an MX node (e.g., MX 202) request to write to a streamlet is granted by a channel manager (e.g., channel manager 214), as described before, the MX node establishes a Transmission Control Protocol (TCP) connection with the Q node (e.g., Q node 208) identified in the grant response received from the channel manager (302). A streamlet can be written concurrently by multiple write grants (e.g., for messages published by multiple publisher clients). Other types of connection protocols between the MX node and the Q node are possible.

The MX node then sends a prepare-publish message with an identifier of a streamlet that the MX node wants to write to the Q node (304). The streamlet identifier and Q node identifier can be provided by the channel manager in the write grant as described earlier. The Q node hands over the message to a handler process 301 (e.g., a computing process running on the Q node) for the identified streamlet (306). The handler process can send to the MX node an acknowledgement (308). After receiving the acknowledgement, the MX node starts writing (publishing) messages (e.g., 310, 312, 314, and 318) to the handler process, which in turns stores the received data in the identified streamlet. The handler process can also send acknowledgements (316, 320) to the MX node for the received data. In some implementations, acknowledgements can be piggy-backed or cumulative. For instance, the handler process can send to the MX node an acknowledgement for every predetermined amount of data received (e.g., for every 100 messages received) or for every predetermined time period (e.g., for every one millisecond). Other acknowledgement scheduling algorithms, such as Nagle's algorithm, can be used.

If the streamlet can no longer accept published data (e.g., when the streamlet is full), the handler process sends a Negative-Acknowledgement (NAK) message (330) indicating a problem, following by an EOF (end-of-file) message (332). In this way, the handler process closes the association with the MX node for the publish grant. The MX node can then request a write grant for another streamlet from a channel manager if the MX node has additional messages to store.

Figure 3B:
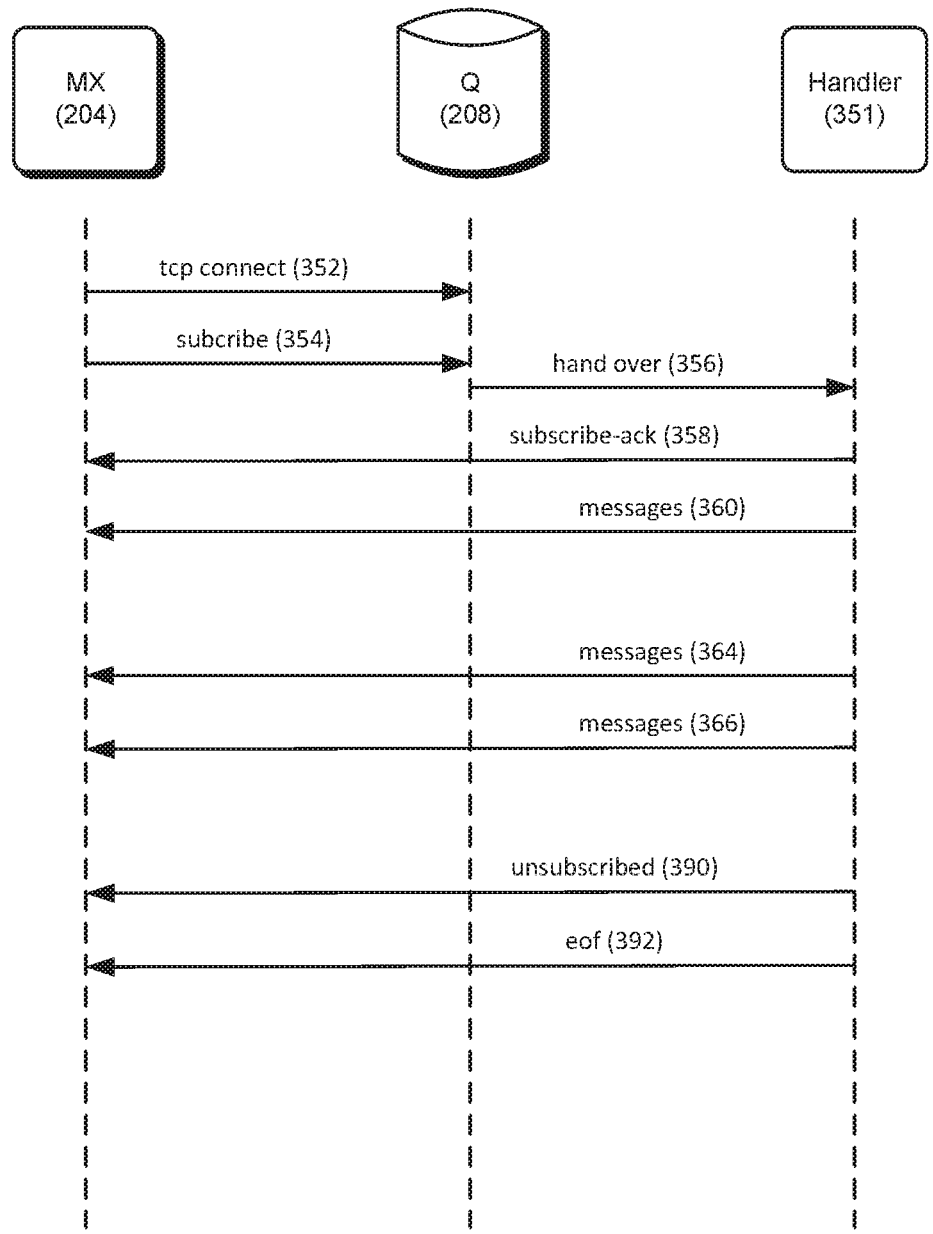
FIG. 3B is a data flow diagram of an example method for reading data from a streamlet.

FIG. 3B is a data flow diagram of an example method for reading data from a streamlet in various embodiments. In FIG. 3B, an MX node (e.g., MX 204) sends to a channel manager (e.g., channel manager 214) a request for reading a particular channel starting from a particular message or time offset in the channel. The channel manager returns to the MX node a read grant including an identifier of a streamlet containing the particular message, a position in the streamlet corresponding to the particular message, and an identifier of a Q node (e.g., Q node 208) containing the particular streamlet. The MX node then establishes a TCP connection with the Q node (352). Other types of connection protocols between the MX node and the Q node are possible.

The MX node then sends to the Q node a subscribe message (354) with the identifier of the streamlet (in the Q node) and the position in the streamlet from which the MX node wants to read (356). The Q node hands over the subscribe message to a handler process 351 for the streamlet (356). The handler process can send to the MX node an acknowledgement (358). The handler process then sends messages (360, 364, 366), starting at the position in the streamlet, to the MX node. In some implementations, the handler process can send all of the messages in the streamlet to the MX node. After sending the last message in a particular streamlet, the handler process can send a notification of the last message to the MX node. The MX node can send to the channel manager another request for another streamlet containing a next message in the particular channel.

If the particular streamlet is closed (e.g., after its TTL has expired), the handler process can send an unsubscribe message (390), followed by an EOF message (392), to close the association with the MX node for the read grant. The MX node can close the association with the handler process when the MX node moves to another streamlet for messages in the particular channel (e.g., as instructed by the channel manager). The MX node can also close the association with the handler process if the MX node receives an unsubscribe message from a corresponding client device.

In various implementations, a streamlet can be written into and read from at the same time instance. For instance, there can be a valid read grant and a valid write grant at the same time instance. In various implementations, a streamlet can be read concurrently by multiple read grants (e.g., for channels subscribed to by multiple publisher clients). The handler process of the streamlet can order messages from concurrent write grants based on, for example, time-of-arrival, and store the messages based on the order. In this way, messages published to a channel from multiple publisher clients can be serialized and stored in a streamlet of the channel.

In the messaging system 100, one or more C nodes (e.g., C node 220) can offload data transfers from one or more Q nodes. For instance, if there are many MX nodes requesting streamlets from Q nodes for a particular channel, the streamlets can be offloaded and cached in one or more C nodes. The MX nodes (e.g., as instructed by read grants from a channel manager) can read the streamlets from the C nodes instead.

As described above, messages for a channel in the messaging system 100 are ordered in a channel stream. A channel manager (e.g., channel manager 214) splits the channel stream into fixed-sized streamlets that each reside on a respective Q node. In this way, storing a channel stream can be shared among many Q nodes; each Q node stores a portion (one or more streamlets) of the channel stream. More particularly, a streamlet can be stored in, for example, registers and/or dynamic memory elements associated with a computing process on a Q node, thus avoiding the need to access persistent, slower storage devices such as hard disks. This results in faster message access. The channel manager can also balance load among Q nodes in the messaging system 100 by monitoring respective workloads of the Q nodes and allocating streamlets in a way that avoids overloading any one Q node.

In various implementations, a channel manager maintains a list identifying each active streamlet, the respective Q node on which the streamlet resides, an identification of the position of the first message in the streamlet, and whether the streamlet is closed for writing. In some implementations, Q nodes notify the channel manager and any MX nodes that are publishing to a streamlet that the streamlet is closed due to being full or when the streamlet's TTL has expired. When a streamlet is closed, the streamlet remains on the channel manager's list of active streamlets until the streamlet's TTL has expired so that MX nodes can continue to retrieve messages from the streamlet.

When an MX node requests a write grant for a given channel and there is not a streamlet for the channel that can be written to, the channel manager allocates a new streamlet on one of the Q nodes and returns the identity of the streamlet and the Q node in the StreamletGrantResponse. Otherwise, the channel manager returns the identity of the currently open for writing streamlet and corresponding Q node in the StreamletGrantResponse. MX nodes can publish messages to the streamlet until the streamlet is full or the streamlet's TTL has expired, after which a new streamlet can be allocated by the channel manager.

When an MX node requests a read grant for a given channel and there is not a streamlet for the channel that can be read from, the channel manager allocates a new streamlet on one of the Q nodes and returns the identity of the streamlet and the Q node in the StreamletGrantResponse. Otherwise, the channel manager returns the identity of the streamlet and Q node that contains the position from which the MX node wishes to read. The Q node can then begin sending messages to the MX node from the streamlet beginning at the specified position until there are no more messages in the streamlet to send. When a new message is published to a streamlet, MX nodes that have subscribed to that streamlet will receive the new message. If a streamlet's TTL has expired, the handler process 351 sends an EOF message (392) to any MX nodes that are subscribed to the streamlet.

As described earlier in reference to FIG. 2, the messaging system 100 can include multiple channel managers (e.g., channel managers 214, 215). Multiple channel managers provide resiliency and prevent single point of failure. For instance, one channel manager can replicate lists of streamlets and current grants it maintains to another "slave" channel manager. As for another example, multiple channel managers can coordinate operations between them using distributed consensus protocols, such as, for example, Paxos or Raft protocols.

Figure 4A:
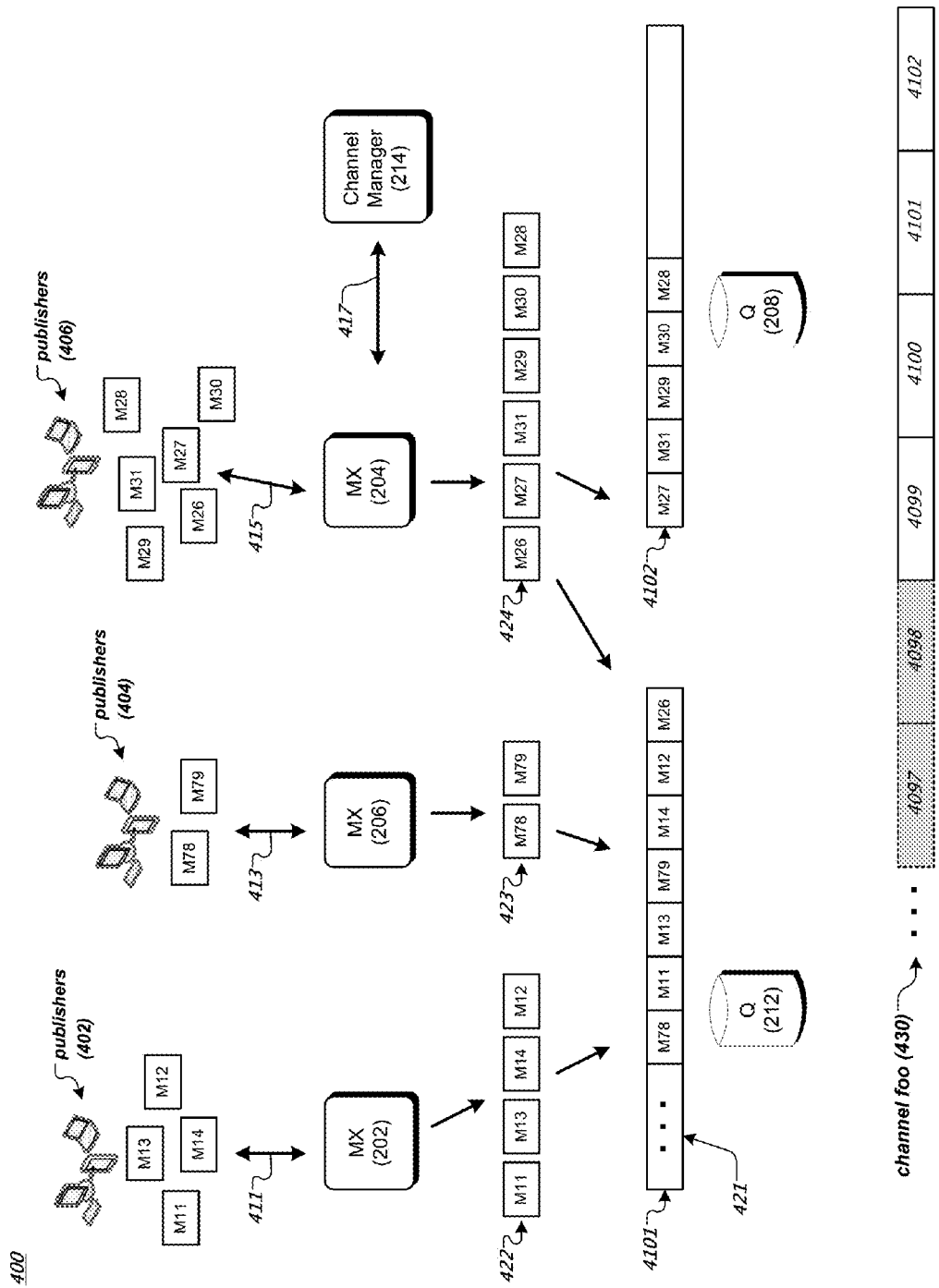
FIG. 4A is a data flow diagram of an example method for publishing messages to a channel of a messaging system.

FIG. 4A is a data flow diagram of an example method for publishing messages to a channel of a messaging system. In FIG. 4A, publishers (e.g., publisher clients 402, 404, 406) publish messages to the messaging system 100 described earlier in reference to FIG. 2. For instance, publishers 402 respectively establish connections 411 and send publish requests to the MX node 202. Publishers 404 respectively establish connections 413 and send publish requests to the MX node 206. Publishers 406 respectively establish connections 415 and send publish requests to the MX node 204. Here, the MX nodes can communicate (417) with a channel manager (e.g., channel manager 214) and one or more Q nodes (e.g., Q nodes 212 and 208) in the messaging system 100 via the internal network 218.

By way of illustration, each publish request (e.g., in JSON key/value pairs) from a publisher to an MX node includes a channel name and a message. The MX node (e.g., MX node 202) can assign the message in the publish request to a distinct channel in the messaging system 100 based on the channel name (e.g., "foo") of the publish request. The MX node can confirm the assigned channel with the channel manager 214. If the channel (specified in the subscribe request) does not yet exist in the messaging system 100, the channel manager can create and maintain a new channel in the messaging system 100. For instance, the channel manager can maintain a new channel by maintaining a list identifying each active streamlet of the channel's stream, the respective Q node on which the streamlet resides, and identification of the positions of the first and last messages in the streamlet as described earlier.

For messages of a particular channel, the MX node can store the messages in one or more buffers or streamlets in the messaging system 100. For instance, the MX node 202 receives from the publishers 402 requests to publish messages M11, M12, M13, and M14 to a channel foo. The MX node 206 receives from the publishers 404 requests to publish messages M78 and M79 to the channel foo. The MX node 204 receives from the publishers 406 requests to publish messages M26, M27, M28, M29, M30, and M31 to the channel foo.

The MX nodes can identify one or more streamlets for storing messages for the channel foo. As described earlier, each MX node can request a write grant from the channel manager 214 that allows the MX node to store the messages in a streamlet of the channel foo. For instance, the MX node 202 receives a grant from the channel manager 214 to write messages M11, M12, M13, and M14 to a streamlet 4101 on the Q node 212. The MX node 206 receives a grant from the channel manager 214 to write messages M78 and M79 to the streamlet 4101. Here, the streamlet 4101 is the last one (at the moment) of a sequence of streamlets of the channel stream 430 storing messages of the channel foo. The streamlet 4101 has messages (421) of the channel foo that were previously stored in the streamlet 4101, but is still open, i.e., the streamlet 4101 still has space for storing more messages and the streamlet's TTL has not expired.

The MX node 202 can arrange the messages for the channel foo based on the respective time that each message was received by the MX node 202, e.g., M11, M13, M14, M12 (422), and store the received messages as arranged in the streamlet 4101. That is, the MX node 202 receives M11 first, followed by M13, M14, and M12. Similarly, the MX node 206 can arrange the messages for the channel foo based on their respective time that each message was received by the MX node 206, e.g., M78, M79 (423), and store the received messages as arranged in the streamlet 4101. Other arrangements or ordering of the messages for the channel are possible.

The MX node 202 (or MX node 206) can store the received messages using the method for writing data to a streamlet described earlier in reference to FIG. 3A, for example. In various implementations, the MX node 202 (or MX node 206) can buffer (e.g., in a local data buffer) the received messages for the channel foo and store the received messages in a streamlet for the channel foo (e.g., streamlet 4101) when the buffered messages reach a predetermined number or size (e.g., 100 messages) or when a predetermined time (e.g., 50 milliseconds) has elapsed. For instance, the MX node 202 can store in the streamlet 100 messages at a time or in every 50 milliseconds. Other acknowledgement scheduling algorithms, such as Nagle's algorithm, can be used.

In various implementations, the Q node 212 (e.g., a handler process) stores the messages of the channel foo in the streamlet 4101 in the order as arranged by the MX node 202 and MX node 206. The Q node 212 stores the messages of the channel foo in the streamlet 4101 in the order the Q node 212 receives the messages. For instance, assume that the Q node 212 receives messages M78 (from the MX node 206) first, followed by messages M11 and M13 (from the MX node 202), M79 (from the MX node 206), and M14 and M12 (from the MX node 202). The Q node 212 stores in the streamlet 4101 the messages in the order as received, e.g., M78, M11, M13, M79, M14, and M12, immediately after the messages 421 that are already stored in the streamlet 4101. In this way, messages published to the channel foo from multiple publishers (e.g., 402, 404) can be serialized in a particular order and stored in the streamlet 4101 of the channel foo. Different subscribers that subscribe to the channel foo will receive messages of the channel foo in the same particular order, as will be described in more detail in reference to FIG. 4B.

In the example of FIG. 4A, at a time instance after the message M12 was stored in the streamlet 4101, the MX node 204 requests a grant from the channel manager 214 to write to the channel foo. The channel manager 214 provides the MX node 204 a grant to write messages to the streamlet 4101, as the streamlet 4101 is still open for writing. The MX node 204 arranges the messages for the channel foo based on the respective time that each message was received by the MX node 204, e.g., M26, M27, M31, M29, M30, M28 (424), and stores the messages as arranged for the channel foo.

By way of illustration, assume that the message M26 is stored to the last available position of the streamlet 4101. As the streamlet 4101 is now full, the Q node 212 sends to the MX node 204 a NAK message, following by an EOF message, to close the association with the MX node 204 for the write grant, as described earlier in reference to FIG. 3A. The MX node 204 then requests another write grant from the channel manager 214 for additional messages (e.g., M27, M31, and so on) for the channel foo.

The channel manager 214 can monitor available Q nodes in the messaging system 100 for their respective workloads (e.g., how many streamlets are residing in each Q node). The channel manager 214 can allocate a streamlet for the write request from the MX node 204 such that overloading (e.g., too many streamlets or too many read or write grants) can be avoided for any given Q node. For instance, the channel manager 214 can identify a least loaded Q node in the messaging system 100 and allocate a new streamlet on the least loaded Q node for write requests from the MX node 204. In the example of FIG. 4A, the channel manager 214 allocates a new streamlet 4102 on the Q node 208 and provides a write grant to the MX node 204 to write messages for the channel foo to the streamlet 4102. As shown in FIG. 4A, the Q node stores in the streamlet 4102 the messages from the MX node 204 in an order as arranged by the MX node 204: M27, M31, M29, M30, and M28 (assuming that there is no other concurrent write grant for the streamlet 4102 at the moment).

When the channel manager 214 allocates a new streamlet (e.g., streamlet 4102) for a request for a grant from an MX node (e.g., MX node 204) to write to a channel (e.g., foo), the channel manager 214 assigns to the streamlet its TTL, which will expire after TTLs of other streamlets that are already in the channel's stream. For instance, the channel manager 214 can assign to each streamlet of the channel foo's channel stream a TTL of 3 minutes when allocating the streamlet. That is, each streamlet will expire 3 minutes after it is allocated (created) by the channel manager 214. Since a new streamlet is allocated after a previous streamlet is closed (e.g., filled entirely or expired), in this way, the channel foo's channel stream comprises streamlets that each expires sequentially after its previous streamlet expires. For instance, as shown in an example channel stream 430 of the channel foo in FIG. 4A, streamlet 4098 and streamlets before 4098 have expired (as indicated by the dotted-lined gray-out boxes). Messages stored in these expired streamlets are not available for reading for subscribers of the channel foo. Streamlets 4099, 4100, 4101, and 4102 are still active (not expired). The streamlets 4099, 4100, and 4101 are closed for writing, but still are available for reading. The streamlet 4102 is available for reading and writing, at the moment when the message M28 was stored in the streamlet 4102. At a later time, the streamlet 4099 will expire, following by the streamlets 4100, 4101, and so on.

Figure 4B:
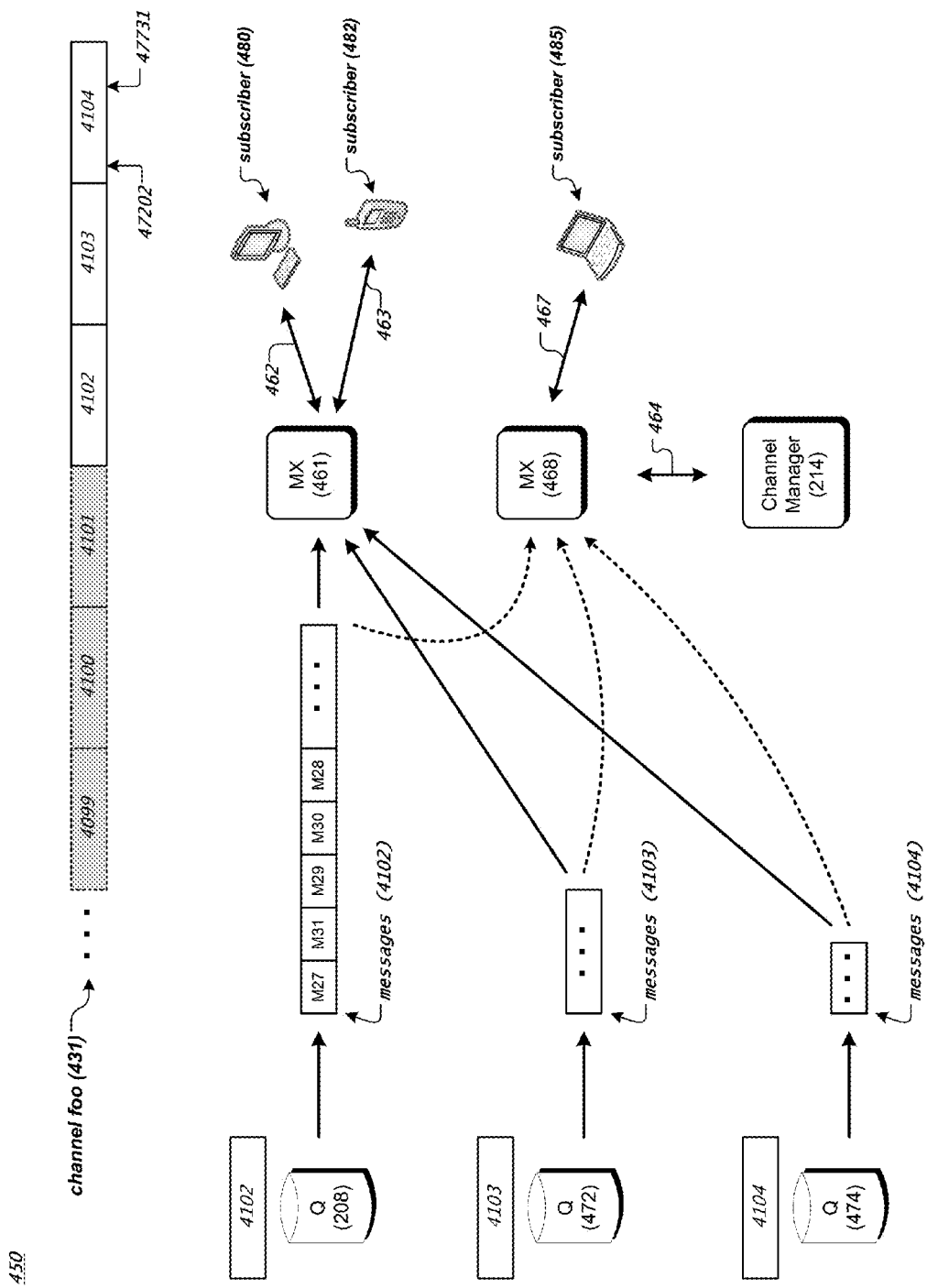
FIG. 4B is a data flow diagram of an example method for subscribing to a channel of a messaging system.

FIG. 4B is a data flow diagram of an example method for subscribing to a channel of a messaging system. In FIG. 4B, a subscriber 480 establishes a connection 462 with an MX node 461 of the messaging system 100. Subscriber 482 establishes a connection 463 with the MX node 461. Subscriber 485 establishes a connection 467 with an MX node 468 of the messaging system 100. Here, the MX nodes 461 and 468 can respectively communicate (464) with the channel manager 214 and one or more Q nodes in the messaging system 100 via the internal network 218.

A subscriber (e.g., subscriber 480) can subscribe to the channel foo of the messaging system 100 by establishing a connection (e.g., 462) and sending a request for subscribing to messages of the channel foo to an MX node (e.g., MX node 461). The request (e.g., in JSON key/value pairs) can include a channel name, such as, for example, "foo." When receiving the subscribe request, the MX node 461 can send to the channel manager 214 a request for a read grant for a streamlet in the channel foo's channel stream.

By way of illustration, assume that at the current moment the channel foo's channel stream 431 includes active streamlets 4102, 4103, and 4104, as shown in FIG. 4B. The streamlets 4102 and 4103 each are full. The streamlet 4104 stores messages of the channel foo, including the last message (at the current moment) stored at a position 47731. Streamlets 4101 and streamlets before 4101 are invalid, as their respective TTLs have expired. Note that the messages M78, M11, M13, M79, M14, M12, and M26 stored in the streamlet 4101, described earlier in reference to FIG. 4A, are no longer available for subscribers of the channel foo, since the streamlet 4101 is no longer valid, as its TTL has expired. As described earlier, each streamlet in the channel foo's channel stream has a TTL of 3 minutes, thus only messages (as stored in streamlets of the channel foo) that are published to the channel foo (i.e., stored into the channel's streamlets) no earlier than 3 minutes from the current time can be available for subscribers of the channel foo.

The MX node 461 can request a read grant for all available messages in the channel foo, for example, when the subscriber 480 is a new subscriber to the channel foo. Based on the request, the channel manager 214 provides the MX node 461 a read grant to the streamlet 4102 (on the Q node 208) that is the earliest streamlet in the active streamlets of the channel foo (i.e., the first in the sequence of the active streamlets). The MX node 461 can retrieve messages in the streamlet 4102 from the Q node 208, using the method for reading data from a streamlet described earlier in reference to FIG. 3B, for example. Note that the messages retrieved from the streamlet 4102 maintain the same order as stored in the streamlet 4102. However, other arrangements or ordering of the messages in the streamlet are possible. In various implementations, when providing messages stored in the streamlet 4102 to the MX node 461, the Q node 208 can buffer (e.g., in a local data buffer) the messages and send the messages to the MX node 461 when the buffer messages reach a predetermined number or size (e.g., 200 messages) or a predetermined time (e.g., 50 milliseconds) has elapsed. For instance, the Q node 208 can send the channel foo's messages (from the streamlet 4102) to the MX node 461 200 messages at a time or in every 50 milliseconds. Other acknowledgement scheduling algorithms, such as Nagle's algorithm, can be used.

After receiving the last message in the streamlet 4102, the MX node 461 can send an acknowledgement to the Q node 208, and send to the channel manager 214 another request (e.g., for a read grant) for the next streamlet in the channel stream of the channel foo. Based on the request, the channel manager 214 provides the MX node 461 a read grant to the streamlet 4103 (on Q node 472) that logically follows the streamlet 4102 in the sequence of active streamlets of the channel foo. The MX node 461 can retrieve messages stored in the streamlet 4103, e.g., using the method for reading data from a streamlet described earlier in reference to FIG. 3B, until it retrieves the last message stored in the streamlet 4103. The MX node 461 can send to the channel manager 214 yet another request for a read grant for messages in the next streamlet 4104 (on Q node 474). After receiving the read grant, the MX node 461 retrieves message of the channel foo stored in the streamlet 4104, until the last message at the position 47731. Similarly, the MX node 468 can retrieve messages from the streamlets 4102, 4103, and 4104 (as shown with dotted arrows in FIG. 4B), and provide the messages to the subscriber 485.

The MX node 461 can send the retrieved messages of the channel foo to the subscriber 480 (via the connection 462) while receiving the messages from the Q node 208, 472, or 474. In various implementations, the MX node 461 can store the retrieved messages in a local buffer. In this way, the retrieved messages can be provided to another subscriber (e.g., subscriber 482) when the other subscriber subscribes to the channel foo and requests the channel's messages. The MX node 461 can remove messages stored in the local buffer that each has a time of publication that has exceeded a predetermined time period. For instance, the MX node 461 can remove messages (stored in the local buffer) with respective times of publication exceeding 3 minutes. In some implementations, the predetermined time period for keeping messages in the local buffer on MX node 461 can be the same as or similar to the time-to-live duration of a streamlet in the channel foo's channel stream, since at a given moment, messages retrieved from the channel's stream do not include those in streamlets having respective time-to-lives that had already expired.

The messages retrieved from the channel stream 431 and sent to the subscriber 480 (by the MX node 461) are arranged in the same order as the messages were stored in the channel stream, although other arrangements or ordering of the messages are possible. For instance, messages published to the channel foo are serialized and stored in the streamlet 4102 in a particular order (e.g., M27, M31, M29, M30, and so on), then stored subsequently in the streamlet 4103 and the streamlet 4104. The MX node retrieves messages from the channel stream 431 and provides the retrieved messages to the subscriber 480 in the same order as the messages are stored in the channel stream: M27, M31, M29, M30, and so on, followed by ordered messages in the streamlet 4103, and followed by ordered messages in the streamlet 4104.

Instead of retrieving all available messages in the channel stream 431, the MX node 461 can request a read grant for messages stored in the channel stream 431 starting from a message at particular position, e.g., position 47202. For instance, the position 47202 can correspond to an earlier time instance (e.g., 10 seconds before the current time) when the subscriber 480 was last subscribing to the channel foo (e.g., via a connection to the MX node 461 or another MX node of the messaging system 100). The MX node 461 can send to the channel manager 214 a request for a read grant for messages starting at the position 47202. Based on the request, the channel manager 214 provides the MX node 461 a read grant to the streamlet 4104 (on the Q node 474) and a position on the streamlet 4104 that corresponds to the channel stream position 47202. The MX node 461 can retrieve messages in the streamlet 4104 starting from the provided position, and send the retrieved messages to the subscriber 480.

As described above in reference to FIGS. 4A and 4B, messages published to the channel foo are serialized and stored in the channel's streamlets in a particular order. The channel manager 214 maintains the ordered sequence of streamlets as they are created throughout their respective time-to-lives. Messages retrieved from the streamlets by an MX node (e.g., MX node 461, or MX node 468) and provided to a subscriber can be, in some implementations, in the same order as the messages are stored in the ordered sequence of streamlets. In this way, messages sent to different subscribers (e.g., subscriber 480, subscriber 482, or subscriber 485) can be in the same order (as the messages are stored in the streamlets), regardless which MX nodes the subscribers are connected to.

In various implementations, a streamlet stores messages in a set of blocks of messages. Each block stores a number of messages. For instance, a block can store two hundred kilobytes of messages. Each block has its own time-to-live, which can be shorter than the time-to-live of the streamlet holding the block. Once a block's TTL has expired, the block can be discarded from the streamlet holding the block, as described in more detail below in reference to FIG. 4C.

Figure 4C:
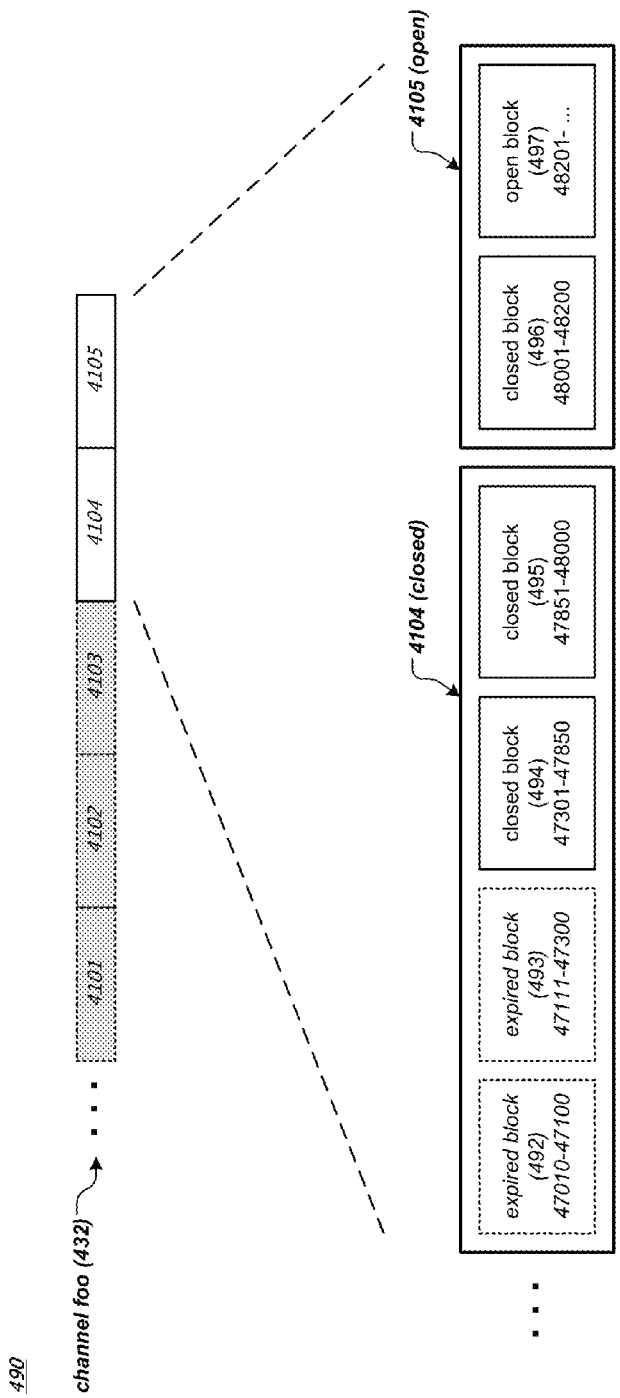
FIG. 4C is an example data structure for storing messages of a channel of a messaging system.

FIG. 4C is an example data structure for storing messages of a channel of a messaging system. As described with the channel foo in reference to FIGS. 4A and 4B, assume that at the current moment the channel foo's channel stream 432 includes active streamlets 4104 and 4105, as shown in FIG. 4C. Streamlet 4103 and streamlets before 4103 are invalid, as their respective TTLs have expired. The streamlet 4104 is already full for its capacity (e.g., as determined by a corresponding write grant) and is closed for additional message writes. The streamlet 4104 is still available for message reads. The streamlet 4105 is open and is available for message writes and reads.

By way of illustration, the streamlet 4104 (e.g., a computing process running on the Q node 474 shown in FIG. 4B) currently holds two blocks of messages. Block 494 holds messages from channel positions 47301 to 47850. Block 495 holds messages from channel positions 47851 to 48000. The streamlet 4105 (e.g., a computing process running on another Q node in the messaging system 100) currently holds two blocks of messages. Block 496 holds messages from channel positions 48001 to 48200. Block 497 holds messages starting from channel position 48201, and still accepts additional messages of the channel foo.

When the streamlet 4104 was created (e.g., by a write grant), a first block (sub-buffer) 492 was created to store messages, e.g., from channel positions 47010 to 47100. Later on, after the block 492 had reached its capacity, another block 493 was created to store messages, e.g., from channel positions 47111 to 47300. Blocks 494 and 495 were subsequently created to store additional messages. Afterwards, the streamlet 4104 was closed for additional message writes, and the streamlet 4105 was created with additional blocks for storing additional messages of the channel foo.

In this example, the respective TTL's of blocks 492 and 493 had expired. The messages stored in these two blocks (from channel positions 47010 to 47300) are no longer available for reading by subscribers of the channel foo. The streamlet 4104 can discard these two expired blocks, e.g., by de-allocating the memory space for the blocks 492 and 493. The blocks 494 or 495 could become expired and be discarded by the streamlet 4104, before the streamlet 4104 itself becomes invalid. Alternatively, streamlet 4104 itself could become invalid before the blocks 494 or 495 become expired. In this way, a streamlet can hold one or more blocks of messages, or contain no block of messages, depending on respective TTLs of the streamlet and blocks, for example.

A streamlet, or a computing process running on a Q node in the messaging system 100, can create a block for storing messages of a channel by allocating a certain size of memory space from the Q node. The streamlet can receive, from an MX node in the messaging system 100, one message at a time and store the received message in the block. Alternatively, the MX node can assemble (i.e., buffer) a group of messages and send the group of messages to the Q node. The streamlet can allocate a block of memory space (from the Q node) and store the group of messages in the block. The MX node can also perform compression on the group of messages, e.g., by removing a common header from each message or performing other suitable compression techniques.

In various implementations, communication between a client device and an MX node in the messaging system 100 can be encoded using JSON messages with key/value pairs, although other message encoding schemes are possible. JSON messages can be exchanged between the client device and MX node through an application programming interface (API) provided by the messaging system 100, for example.

For instance, a publisher client 406 connects to the MX node 204 in the messaging system 100 through the connection 415, as shown in FIG. 4A. The publisher client 406 sends a publish request to the MX node 204. The publish request can be a JSON message including a channel name "foo" and a message "Hello, world!" as follows:

```
{
    "action": "pubsub/publish",
    "body": {
        "channel": "foo",
        "message": "Hello, world!"
    },
    "id": 42
}
```

In the example above, "action" specifies an action for the request (i.e., publish). "id" can be used when the MX node 204 sends back to the publisher client 406 a response (e.g., confirming that the message is published to the channel requested, or reporting a failure). The MX node 204 can assign the message to a distinct channel in the messaging system 100 based on the channel name "foo" specified in the publish request. The MX node 204 publishes the message to the channel foo by storing the message in a buffer or streamlet of the channel foo's channel stream 430 in the messaging system 100.

For instance, the subscriber 480 connects to the MX node 461 in the messaging system 100 through the connection 462, as shown in FIG. 4B. The subscriber client 480 can send a subscribe request to the MX node 461. The subscribe request can be a JSON message including the channel foo as follows:

```
{
    "action": "pubsub/subscribe",
    "body" {
        "channel": "foo",
        "position": 47202
    },
    "id": 341
}
```

In the example, the action for the request is subscribe. The MX node 461 can retrieve messages from the channel foo's channel stream 431 starting from the specified position 47202. If a position is not specified in the subscribe request, the MX node 461 can retrieve all available message stored in the active streamlets in the channel foo's channel stream 431, for example, from streamlets 4102, 4103, and 4104 shown in FIG. 4B.

Services of the messaging system 100 such as channel subscription, message publication and retrieval can be provided to a customer. A customer can create message channels for the customer's users. For instance, a customer can be a music streaming service. The music streaming service can create specific channels in the messaging system 100 as user discussion forums for different music genres such as rock, pop, and classic. A user of the music streaming service can access the music streaming service from a client application running on the user's client device. Meanwhile, the user can also participate in the user discussion forums for rock, pop, or classic, by subscribing or publishing to these specific channels in the messaging system 100. The user can subscribe or publish to these specific channels from the client application that sends subscribe or publish requests in JSON messages to the messaging system 100. For instance, the user's client application can send (e.g., through a connection to an MX node in the messaging system 100) a publish request for the channel pop (i.e., the user discussion forum on pop music) as follows:

```
{
    "action": "pubsub/publish",
    "body" {
        "channel": "pop",
        "message": "Hello!"
    },
    "id": 90123
}
```

When a user requests to publish or subscribe to a particular channel of the customer in the messaging system 100, the messaging system 100 can examine whether the user has the permission or authorization to access the particular channel. The messaging system 100 can also authenticate the user to ascertain that the user is really who the user claims to be. Instead of authorizing or authenticating the user by itself, the messaging system 100 can request the customer to authorize or authenticate the user. More particularly, the messaging system 100 can compose a message requesting authorization or authentication of the user, and publish the message to a specific channel in the messaging system 100 that is subscribed to by the customer, as described in more detail below in reference to FIG. 5.

Figure 5:
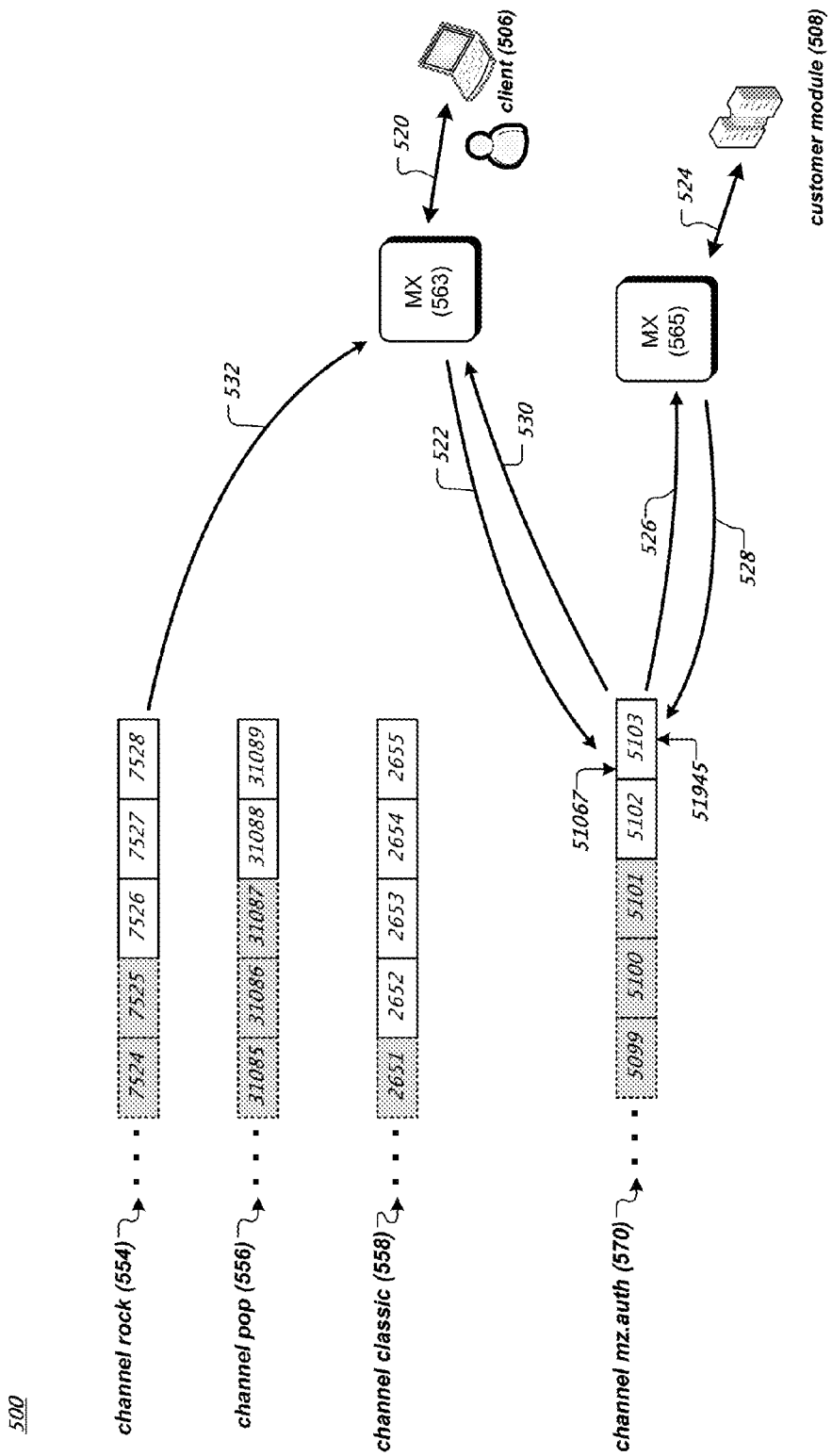
FIG. 5 is a data flow diagram of an example method for authenticating and authorizing a user of a messaging system.

FIG. 5 is a data flow diagram of an example method 500 for authenticating and authorizing a user of the messaging system 100. By way of illustration, the client application running on the user's client device 506 can connect to an MX node 563 in the messaging system 100 through a connection 520. The client application can send a request for authentication to the MX node 563. An authentication request for the user can include one or more credentials of the user. For example, the credentials can be ones that were used by the user to sign up to the music streaming service from the client application and stored in the client device 506 by the client application. For instance, the authentication request can be as follows:

```
{
    "action": "auth/authenticate",
    "body": {
        "method": "ask_customer",
        "credentials": {
            "login": "joe",
            "password": "123"
        }
    },
    "id": 421
}
```

In the example above, credentials for the user are a login or identifier ("joe") and a password. Other types of credentials are possible. The request specifies an action for authenticating and a method for authenticating by asking the customer (e.g., the music streaming service). In the following examples, information messages passed between clients, MX nodes, and customer modules are illustrated in JSON. However, other message formats are possible and other message content is possible. The examples merely illustrate one possible implementation.

Based on the authentication request, the MX node 563 incorporates the credentials into a server-side authentication request as follows:

```
{
    "action": "pubsub/channel/data",
    "body": {
        "channel": "mz.auth",
        "next": 51067,
        "messages": [ {
            "action": "auth/authenticate",
            "body": {
                "credentials": {
                    "username": "joe",
                    "password": "123"
                }
            },
            "id": "1605213056"
        }
        ]
    }
}
```

The MX node 563 then publishes the server-side authentication request to a channel mz.auth that is specific for authentication and authorization by the customer. For instance, the MX node 563 (e.g., as directed by the channel manager 214 of the messaging system 100) can store the authentication request at a position 51067 in a streamlet 5103 of the channel mz.auth's channel stream 570 (522).

A customer module 508 of the customer can retrieve the server-side authentication request from the mz.auth channel by subscribing to the channel mz.auth. The customer module 508 can be one or more software components running on one or more servers of the customer, for example. For instance, the customer module 508 can connect to an MX node 565 of the messaging system 100 through a connection 524. The MX node 565 retrieves the server-side authentication request stored at the position 51067 in the streamlet 4103 of the channel stream 570 and other messages in the channel stream 570 that may be available to the customer module 508 (526). The MX node 565 then provides the server-side authentication request for the user (and the other messages) to the customer module 508.

The customer module 508 can authenticate the user by comparing the user's credentials in the server-side authentication request with its own data (e.g., the credentials provided by the user when the user signed up to the customer's music streaming service). If they match, the customer module 408 can publish a positive response to the mz.auth channel as follows:

```
{
    "action": "pubsub/publish",
    "body": {
        "channel": "mz.auth",
        "message": {
            "action": "auth/authenticate/ok",
            "body": {
                "token": "1605213056.johnsmith"
            },
            "request_id": "1605213056"
        }
    },
    "id": "42"
}
```

The positive response includes a confirmation of the authentication ("action": "auth/authenticate/ok"). The positive response can also include a token that can be used by the user to access the customer's channels in the messaging system 100, as will be described later.

If the credentials in the server-side authentication request do not match the customer's own data, the customer module 408 can publish a negative response to the mz.auth channel as follows:

```
{
    "action": "pubsub/publish",
    "body": {
        "channel": "mz.auth",
        "message": {
            "action": "auth/authenticate/error",
            "body": {
                "error": "incorrect_login_or_password",
                "error_text": "Incorrect login and/or password"
            },
            "request_id": "1605213056"
        }
    },
    "id": "42"
}
```

After receiving the response (positive or negative) from the customer module 508 through the connection 524, the MX node 565 stores the response in a next available position in the channel mz.auth's channel stream 570, e.g., at channel position 51945 in the streamlet 5103 (528). At a later time, the MX node 563 retrieves the response from the channel stream 570 (530). If the response is a positive response, the MX node 563 can allow the user (e.g., the client application on the user's client device 506) to access the messaging system 100 and more particularly to the customer's channels in the messaging system 100. If the response is a negative response, the MX node 563 can forbid the user to further access the customer's channels in the messaging system 100 or close the connection 520.

As described above, to authenticate the user, the messaging system 100 (e.g., the MX node 563) publishes a server-side authentication request to the specific channel mz.auth. The server-side authentication request is retrieved by the customer (e.g., the customer module 508) that is a subscriber and publisher to the specific channel mz.auth. The customer confirms or disapproves the user's identity and publishes a response to the specific channel mz.auth. The messaging system 100 retrieves the response from the specific channel mz.auth and acts accordingly (e.g., allows or denies the user to access the customer's channels in the messaging system 100).

Since the authentication request and the corresponding response are stored in the channel stream of the specific channel mz.auth, they are not lost in case of interrupts such as re-start or time-out on the customer or the client side. In contrast, an authentication request and a corresponding response can be lost due to interrupts if they are transmitted directly between the user's client device and the customer's server over communication networks such as the Internet.

To provide additional security, the specific channel mz.auth can be configured such that it is only accessible to the messaging system 100 itself (e.g., MX nodes) and designated subscribe and publish clients such as the customer module 508. Other subscriber and publish clients (e.g., users of the customer's music streaming service, or other users of the messaging system 100) cannot access the specific channel (e.g., cannot subscribe nor publish to the specific channel).

In addition to authenticating users of the customer, the messaging system 100 can also use the specific channel mz.auth to provide authorization (i.e., granting permissions to different channels) to users of the customer. For instance, the client application on the user's client device 506 can send to the MX node 563 through the connection 520 a request for subscribing (or publishing) to the channel rock of the customer (the user discussion forum on rock music for the music streaming service) as follows:

```
{
    "action": "pubsub/subscribe",
    "body" {
        "channel": "rock",
        "position": 3456
    },
    "id": 1234
}
```

In response to the subscription request above, the MX node 563 can compose a server-side authorization request as follows, for example:

```
{
    "action": "pubsub/channel/data",
    "body": {
        "channel": "mz.auth",
        "next": 21067,
        "messages": [
            {
                "action": "auth/authorize",
                "body": {
                    "token": "1605213056.johnsmith",
                    "channel": "rock",
                    "client_action": "pubsub/subscribe"
                },
                "id": "321062662"
            }
        ]
    }
}
```

The server-side authorization request can include the token for the user that was granted by the customer module 508 when authenticating the user as described earlier. Similarly to the server-side authentication request described earlier, the MX node 563 stores (publishes) the server-side authorization request to the channel mz.auth's channel stream 570. The customer module 508 retrieves the server-side authorization request from the channel mz.auth's channel stream 570 (e.g., through the MX node 565), determines whether the user satisfies one or more permission rules, and publishes a positive or negative response to the channel mz.auth's channel stream 570 (e.g., through the MX node 565). A permission rule can determine granting or denying access to the requested channel based on a pattern that the channel (e.g., one or more name spaces of the channel) must match, as will be described in more detail later.

The response can include an indication that permits or forbids (respectively below) the user to subscribe to the requested channel and an expiration time (e.g., expressed in UNIX time) as follows:

```
{
    "action": "pubsub/publish",
    "body": {
        "channel": "mz.auth",
        "message": {
            "action": "auth/authorize/permit",
            "body": {
                "expiration": 1432172120
            },
            "request_id": "321062662"
        }
    },
    "id": "42"
}
{
    "action": "pubsub/publish",
    "body": {
```

```
        "channel": "mz.auth",
        "message": {
            "action": "auth/authorize/forbid",
            "body": {
                "expiration": 1432172120
            },
            "request_id": "321062662"
        }
    },
    "id": "42"
}
```

At a later time, the MX node 563 retrieves the response from the channel mz-auth's channel stream 570. If the response is a positive response (e.g., the user can subscribe to messages of the channel rock), the MX node 563 can retrieve available messages from the channel rock's stream 554 (532), and provide the retrieved messages to the user's client 506. If the response is a negative message (e.g., the user cannot subscribe to messages of the channel rock), the MX node 563 does not retrieve messages from the channel rock's stream 554 for the user.

In addition to granting or forbidding permission requests sent from an MX node in the messaging system 100, the customer module 508 can also store permission rules in the messaging system 100 by sending requests, such as JSON messages, through an API provided by the messaging system 100. For instance, the customer module 508 can send to the MX node 506 a request to add permission rules for channels with name space patterns rock.* (e.g., where "*" denotes a wild card in matching patterns) as follows:

```
{
    "action": "pubsub/publish",
    "body": {
        "channel": "mz.auth",
        "message": {
            "action": "auth/add-permissions",
            "body": {
                "rules": [
                    {
                        "channel_namespace": "rock.*",
                        "client_action": "pubsub/publish",
                        "permission": "permitWithToken"
                    },
                    {
                        "channel_namespace": "rock.*",
                        "client_action": "pubsub/subscribe",
                        "permission": "permitWithToken"
                    }
                ]
            }
        }
    },
    "id": "42"
}
```

In the example above, the permission rules specify that channels with names starting with "rock." can be assessable (publish or subscribe) to a user with a token (e.g., the user has been authenticated by the customer module 508).

After receiving the request, the MX node 565 can store the permission rules in the request in the messaging system 100 (e.g., in a database of the messaging system 100).

The customer module 508 can send to the MX Node 506 a request to drop (delete) permission rules by including an action "action": "auth/drop□permissions, for example.

Authentication and authorization of users of the messaging system 100 are further described below in reference to FIGS. 6A and 6B.

Figure 6A:
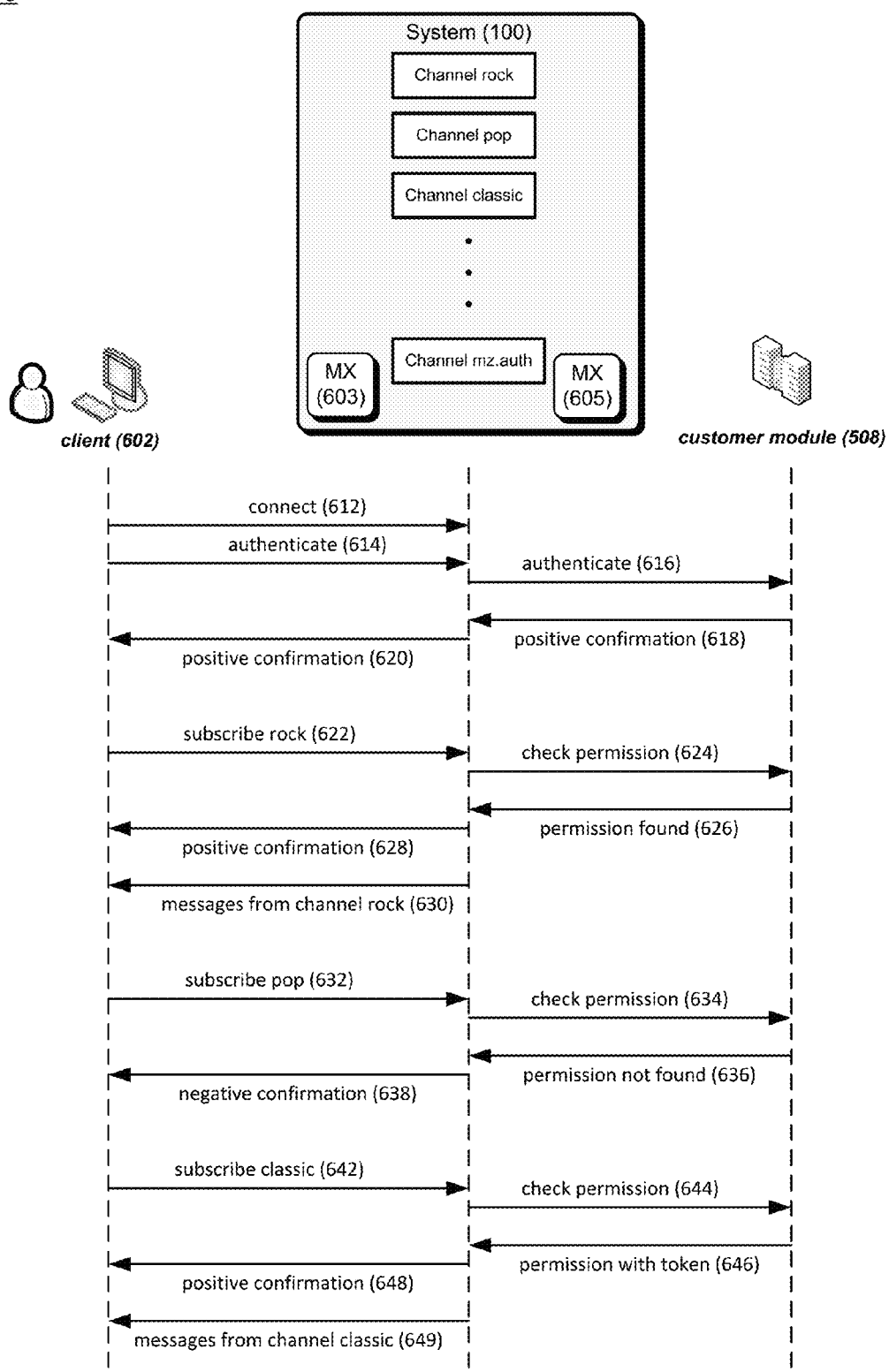
FIG. 6A is a data flow diagram of an example method for authenticating and authorizing a user of a messaging system.

FIG. 6A is a data flow diagram of another example method 600 for authenticating and authorizing a user of the messaging system 100. By way of illustration, the customer module 508 has the following permission rules for the customer's channels rock, pop, and classic in the messaging system 100:

```
[
    {"channel_namespace": "rock", "client_action": "pubsub/subscribe", "permission": "permit"},
    {"channel_namespace": "pop", "client_action": "pubsub/subscribe", "permission": "forbid"},
    {"channel_namespace": "classic", "client_action": "pubsub/subscribe", "permission": "permissionWithToken"}
]
```

In FIG. 6A, a client application running on a user's client device 602 connects to the messaging system 100 such as an MX node 603 (612). After connecting to the MX node in messaging system 100, the client application sends the user's credentials to the MX node for authenticating the user (614). The MX node publishes (stores) a server-side authentication request to the specific channel mz.auth.

As described earlier, the customer module 508 is connected to the messaging system 100 through an MX node (e.g., MX node 605), and is a subscriber and publisher to the channel mz.auth. Here, the customer module 508 receives from the mz.auth's channel stream (through the MX node 605) the server-side authentication request (616), confirms the user's identify based on the credentials, and publishes a positive response to the mz.auth channel (618). The MX node 603 retrieves the positive response, and sends a positive confirmation to the client device 602 (620). If the customer module 508 provides a token with the positive response, the MX node 603 also stores the token for later use.

For instance, the user (through the client application on the client device 602) can send a request to the MX node 603 to subscribe to the customer's channel rock (622). The MX node 603 publishes a server-side authorization request of the channel rock for the user to the mz.auth channel. The customer module 508 receives the server-side authorization request from the mz.auth channel (624), and compares the request with the permission rules above. Since the permission rules permit subscription to the channel rock, the customer module 508 publishes a positive response to the mz.auth channel (626). The MX node 603 retrieves the positive response from the mz.auth channel, and sends a positive confirmation to the client device 602 (628). Based on the positive confirmation, the MX node 603 can retrieve messages from the channel rock, and provides the retrieved messages to the client device 602 (630).

For instance, the user can send (through the client application on the client device 602) a request to the MX node 603 to subscribe to the customer's channel pop (632). The MX node 603 publishes a server-side authorization request of the channel pop for the user to the mz.auth channel. The customer module 508 receives the server-side authorization request from the mz.auth channel (634), and compares the request with the permission rules above. Since the permission rules forbid subscription to the channel pop, the customer module 508 publishes a negative response to the mz.auth channel (636). The MX node 603 retrieves the negative response from the mz.auth channel, and sends a negative confirmation to the client device 602 (638). In this case, the MX node 603 does not retrieve messages from the channel pop for the user.

For instance, the user can send (through the client application on the client device 602) a request to the MX node 603 to subscribe to the customer's channel classic (642). The MX node 603 publishes a server-side authorization request of the channel classic for the user to the mz.auth channel. The customer module 508 receives the server-side authorization request from the mz.auth channel (644), and compares the request with the permission rules above. Since the permission rules permit subscription with token to the channel classic, the customer module 508 publishes a positive response with a condition of a valid token to the mz.auth channel (646). The MX node 603 retrieves the positive response from the mz.auth channel, confirms that the user has a valid token stored in the messaging system 100, and then sends a positive confirmation to the client device 602 (648). Based on the positive confirmation, the MX node 603 can retrieve messages from the channel classic, and provides the retrieved messages to the client device 602 (649).

Figure 6B:
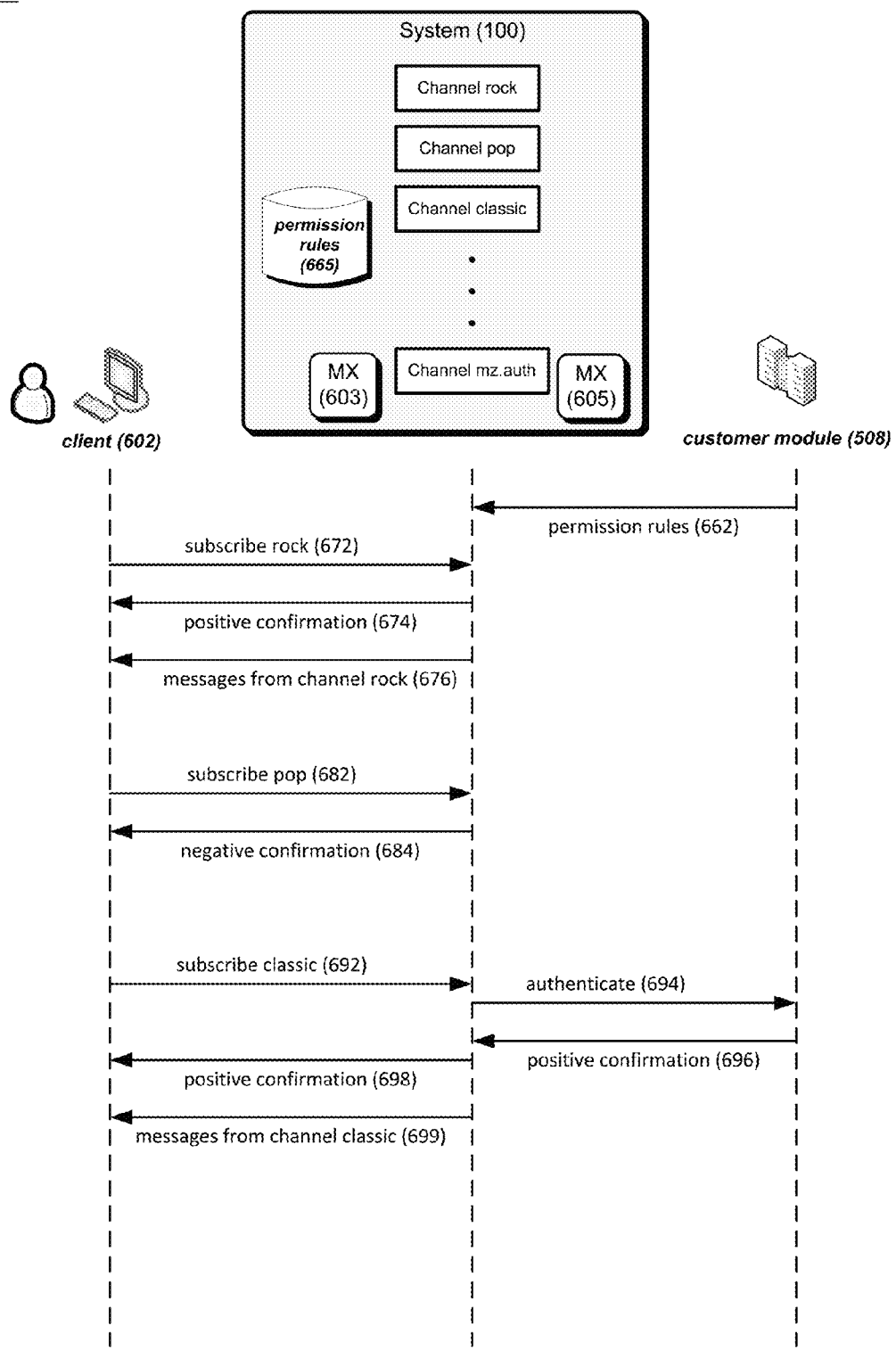
FIG. 6B is a data flow diagram of an example method for authenticating and authorizing a user of a messaging system.

FIG. 6B is a data flow diagram of another example method 650 for authenticating and authorizing a user of the messaging system 100. In this example, the customer module 508 publishes the permission rules above to the mz.auth channel (662). The messaging system 100 can store (cache) the permission rules in a permission rules database 665.

For instance, the user can send (through the client application on the client device 602) a request to the MX node 603 to subscribe to the customer's channel rock (672). Instead of publishing a server-side authorization request to the channel mz.auth, the MX node 603 accesses the permission rules stored in the permission rules database 665, and determines that the user can subscribe to the channel rock. The MX node 603 sends a positive confirmation to the client device 602 (674). The MX node 603 then retrieves messages from the channel rock, and provides the retrieved messages to the client device 602 (676).

For instance, the user can send (through the client application on the client device 602) a request to the MX node 603 to subscribe to the customer's channel pop (682). The MX node 603 accesses the permission rules stored in the permission rules database 665, determines that the user cannot subscribe to the channel pop based on the permission rules, and sends a negative confirmation to the client device 602 (684).

For instance, the user can send (through the client application on the client device 602) a request to the MX node 603 to subscribe to the customer's channel classic (692). The MX node 603 accesses the permission rules stored in the permission rules database 665, and determines that the user can subscribe to the channel pop with a valid token.

By way of illustration, assume at a current moment that there is no valid token associated with the user stored in the messaging system 100 (e.g., when a previous token has expired, or when the messaging system 100 has not authenticated the user). The MX node 603 can obtain the user's credentials (e.g., from the client application running on the client device 602), and publish a server-side authentication request with the user's credentials to the channel mz.auth. The customer module 508 receives the server-side authentication request from the mz.auth channel (694), verifies the user's credentials with its own data, and publishes a positive response to the channel mz.auth (696). The MX node 603 retrieves the positive response from the channel mz.auth, and sends a positive confirmation to the client device 502 (698). Based on the positive confirmation, the MX node 603 then retrieves messages from the channel classic, and provides the retrieved messages to the client device 602 (699).

In various implementations, a permission rule for granting or denying access to a channel, as requested from a subscribe or publish client, can comprise a pattern that one or more name spaces of the channel must match. By way of illustration, permission rules can be as follows:

| Permission pattern | Permission type |
|---|---|
| a | Forbid |
| a.* | Permit |
| a.b | permit with token |
| a.b.* | Forbid |
| a.b.c | Permit |
| a.b.c.* | permit with token |

In the permission rules above, action types (publish or subscribe) are omitted for the purpose of illustration. The "*" denotes a wild card in matching patterns. For a requested channel, a list is generated of possible channel name patterns comprising name spaces of the requested channel. The list is then compared to the permission patterns in the permission rules, starting from the most matching channel name pattern to the least matching channel name pattern. If no match is found, a pre-determined permission type (e.g., permit) can be used. The table below lists example channel names and for each example channel name, its possible channel name patterns, and how the patterns match the permission rules listed in the table above.

| Channel name | Possible channel name patterns | Permission | What matches |
|---|---|---|---|
| a | a | Forbid | a |
| a.z | a.z, a.* | Permit | a.* |
| a.b | a.b, a* | permit with token | a.b |
| a.b.z | a.b.z, a.b.*, a.* | Forbid | a.b.* |
| a.b.c | a.b.c, a.b.*, a.* | Permit | a.b.c |
| a.b.c.z | a.b.c.z, a.b.c.*, a.b.*, a.* | permit with token | a.b.c.* |
| z | z | Permit | none |

Figure 7:
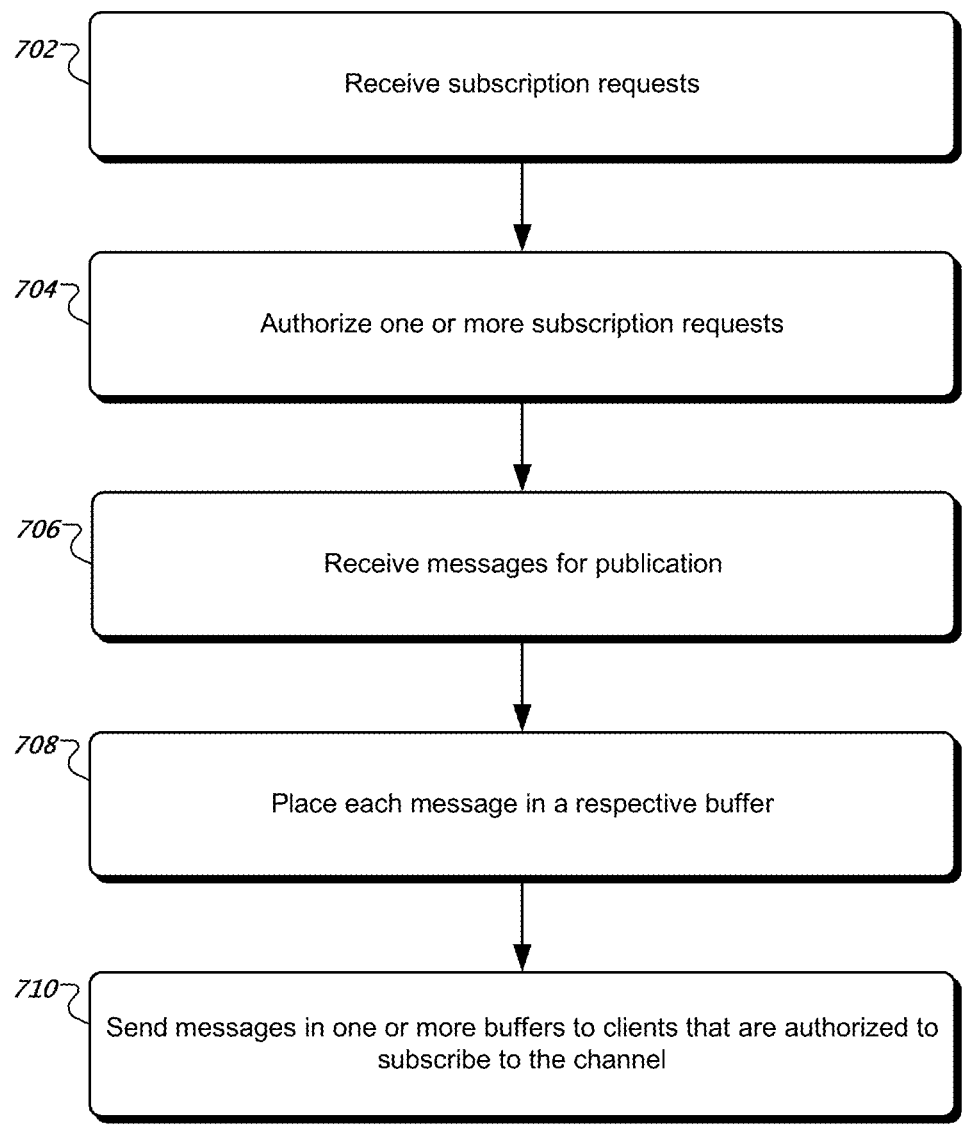
FIG. 7 is a flow chart of an example method for authorizing subscription and publication to message channels of a messaging system.

FIG. 7 is a flow chart of an example method for authorizing subscription and publication to message channels of a messaging system. The method can be implemented using an MX node (e.g., MX node 563 of FIG. 5), for example. The method begins by receiving one or more subscription requests, each subscription request having been received from a respective client and being for a respective channel (702). The method authorizes one or more of the subscription requests, wherein each authorized subscription request permits the client of the request to receive messages published to the channel of the request (704). The method receives one or more messages for publication, each message having been received from a respective client and being for publication on a respective channel (706). For each of the messages, the method places the message in a respective buffer for the channel of the message, wherein the messages are present in the buffer during a finite time-to-live period for the buffer (708). For one or more of the channel buffers, the method sends any messages in the buffer to clients that are authorized to subscribe to the channel (710).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative, procedural, or functional languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, optical disks, or solid state drives. However, a computer need not have such devices. Moreover, a computer can be embedded in another device, e.g., a smart phone, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
   receiving at least one subscription request, wherein each subscription request is received from a respective subscriber client and is for a respective channel;
   authorizing one or more of the at least one subscription request, wherein each authorized subscription request permits a subscriber client of the request to receive messages published to a channel of the request;

receiving one or more messages for publication, wherein each message is received from a respective publisher client and is for publication on a respective channel;

for each message, placing, by one or more computer processors, the message in a respective buffer for the respective channel of the message according to an order, wherein messages are present in the respective buffer during a finite time-to-live period for the respective buffer; and for each buffer that has not expired, sending any messages in the buffer according to the order to subscriber clients that are authorized to subscribe to the channel associated with the buffer.

2. The method of claim 1, wherein authorizing one or more of the at least one subscription request comprises:

determining that the channel of a particular subscription request matches a pattern; and authorizing the subscriber client of the particular subscription request based on a permission corresponding to the pattern.

3. The method of claim 2, wherein determining that the channel of the particular subscription request matches the pattern comprises:

determining that one or more name spaces of the channel matches the pattern.

4. The method of claim 1, further comprising:

receiving at least one publication request, wherein each publication request is received from a respective publisher client and is for a respective channel; and authorizing one or more of the at least one publication request, wherein each authorized publication request permits the respective publisher client to publish one or more messages to the channel of the request.

5. The method of claim 4, wherein placing the message in the respective buffer for the respective channel of the message comprises:

determining that the publisher client from which a particular message was received is authorized to publish messages to the channel of the particular message.

6. The method of claim 4, wherein authorizing one or more of the at least one publication request comprises:

determining that the channel of a particular publication request matches a pattern; and authorizing the publisher client of the particular publication request based on a permission corresponding to the pattern.

7. The method of claim 1, wherein placing the message in the respective buffer for the respective channel of the message further comprises:

deleting any messages in the respective buffer upon expiration of a time-to-live for the buffer.

8. The method of claim 1, further comprising:

receiving one or more authentication requests through respective connections, wherein each authentication request comprises one or more credentials of a respective client; and for each authentication request:

publishing, to a first channel, a first message requesting to authenticate the respective client, wherein the first message comprises the one or more credentials;

retrieving, from the first channel, a published second message, wherein the published second message comprises an authentication confirmation provided in response to the first message; and based thereon, authenticating the respective client.

9. The method of claim 8, further comprising:

storing, in information associated with the respective connection, an indication of the authentication confirmation.

10. The method of claim 9, further comprising:

determining that the respective connection has ceased to exist; and based thereon, removing the information.

11. The method of claim 8, wherein the first channel is not accessible to the respective client.

12. A computing device, comprising:

one or more computer processors to:

receive at least one subscription request, wherein each subscription request is received from a respective subscriber client and is for a respective channel;

authorize one or more of the at least one subscription request, wherein each authorized subscription request permits a subscriber client of the request to receive messages published to a channel of the request;

receive one or more messages for publication, wherein each message is received from a respective publisher client and is for publication on a respective channel;

for each message, place the message in a respective buffer for the respective channel of the message according to an order, wherein messages are present in the respective buffer during a finite time-to-live period for the respective buffer; and for each buffer that has not expired, send any messages in the buffer according to the order to subscriber clients that are authorized to subscribe to the channel associated with the buffer.

13. The computing device of claim 12, wherein to authorize one or more the at least one subscription request the one or more processors are further to:

determine that the channel of a particular subscription request matches a pattern; and authorize the subscriber client of the particular subscription request based on a permission corresponding to the pattern.

14. The computing device of claim 12, wherein the one or more processors are further to:

receive at least one publication request, wherein each publication request is received from a respective publisher client and is for a respective channel; and authorize one or more of the at least one publication request, wherein each authorized publication request permits the respective publisher client to publish one or more messages to the channel of the request.

15. The computing device of claim 14, wherein to place the message in the respective buffer for the channel of the message the one or more processors are further to:

determine that the publisher client from which a particular message was received is authorized to publish messages to the channel of the particular message.

16. The computing device of claim 14, wherein to authorize one or more of the at least one publication request the one or more processors are further to:

determine that the channel of a particular publication request matches a pattern; and authorize the publisher client of the particular publication request based on a permission corresponding to the pattern.

17. The computing device of claim 12, wherein to place the message in the respective buffer for the channel of the message the one or more processors are further to:

delete any messages in the respective buffer upon expiration of a time-to-live for the buffer.

18. The computing device of claim 12, wherein the one or more processors are further to:

receive one or more authentication requests through respective connections, wherein each authentication request is received from a respective client and comprises one or more credentials of a respective client; and for each authentication request:

publish, to a first channel, a first message requesting to authenticate the respective client, wherein the first message comprises the one or more credentials;

retrieve, from the first channel, a published message, wherein the second published message comprises an authentication confirmation provided in response to the first message; and based thereon, authenticate the respective client.

19. The computing device of claim 18, wherein the one or more processors are further:

store, in information associated with the respective connection, an indication of the authentication confirmation.

20. A non-transitory computer-readable medium having instruction stored thereon that, when executed by one or more computer processors, cause the one or more computer processors to:

receive at least one subscription request, wherein each subscription request is received from a respective subscriber client and is for a respective channel;

authorize one or more of the at least one subscription request, wherein each authorized subscription request permits a subscriber client of the request to receive messages published to the channel of the request;

receive one or more messages for publication, wherein each message is received from a respective publisher client and is for publication on a respective channel;

for each message, place the message in a respective buffer for the respective channel of the message according to an order, wherein messages are present in the buffer during a finite time-to-live period for the respective buffer; and for each buffer that has not expired, send any messages in the buffer according to the order to subscriber clients that are authorized to subscribe to the channel associated with the buffer.

* * * * *